United States Patent
Davis, III et al.

(10) Patent No.: US 11,377,323 B2
(45) Date of Patent: Jul. 5, 2022

(54) RETROFITTING AN ELEVATOR MACHINE WITH PRIMARY AND SECONDARY BRAKING

(71) Applicant: Otis Elevator Company, Farmington, CT (US)

(72) Inventors: Daniel B. Davis, III, Middlefield, CT (US); Robert K. Williams, Tariffville, CT (US); John Eschenbrenner, Canton, CT (US); Gregory M. O'Seep, Simsbury, CT (US); James L. Hubbard, Kensington, CT (US); Martin J. Hardesty, West Hartford, CT (US); Bruce P. Swaybill, Farmington, CT (US); Jesse R. Richter, West Hartford, CT (US); Gary P. Mendrala, West Springfield, MA (US); Patricia Derwinski, Farmington, CT (US); Christopher H. Koenig, Granby, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 180 days.

(21) Appl. No.: 16/812,776

(22) Filed: Mar. 9, 2020

(65) Prior Publication Data
US 2020/0207580 A1 Jul. 2, 2020

Related U.S. Application Data

(63) Continuation of application No. 15/355,834, filed on Nov. 18, 2016, now Pat. No. 10,618,775.

(51) Int. Cl.
*B66B 5/18* (2006.01)
*B66B 5/22* (2006.01)
(Continued)

(52) U.S. Cl.
CPC .................. *B66B 5/18* (2013.01); *B66B 5/22* (2013.01); *B66B 11/004* (2013.01); *B66B 11/08* (2013.01);
(Continued)

(58) Field of Classification Search
CPC ......... B66B 11/004; B66B 11/08; B66D 5/14; F16D 65/123; F16D 65/124
See application file for complete search history.

(56) References Cited

U.S. PATENT DOCUMENTS

| 3,964,692 A | 6/1976 | Pendleton |
| 4,108,280 A | 8/1978 | Eastcott et al. |

(Continued)

FOREIGN PATENT DOCUMENTS

| CN | 87212941 U | 8/1988 |
| CN | 1075467 A | 8/1993 |

(Continued)

OTHER PUBLICATIONS

EP Office Action; Application No. 17202159.4-1017; dated Jul. 9, 2020; 4 pages.

(Continued)

*Primary Examiner* — Diem M Tran
(74) *Attorney, Agent, or Firm* — Cantor Colburn LLP

(57) ABSTRACT

A method is disclosed of retrofitting an elevator machine with primary and secondary braking, the machine being disposed on a machine support frame in an elevator machine room, and engaging one or more ropes for providing selective movement of an elevator car disposed in an elevator shaft, the machine having a drive sheave including a cylindrical brake drum, and brake components including dual brake arms; the method including: removing the brake components; affixing flanged disc segments about the drum and interlocking the flanged disc segments to form a brake (Continued)

rotor; and mounting respective brake calipers to frame mounts for providing primary and secondary braking to the elevator machine.

10 Claims, 28 Drawing Sheets

(51) Int. Cl.
*B66B 19/00* (2006.01)
*B66B 11/00* (2006.01)
*B66B 11/08* (2006.01)
*F16D 55/225* (2006.01)
*B66D 5/14* (2006.01)
*F16D 65/02* (2006.01)

(52) U.S. Cl.
CPC .......... *B66B 19/007* (2013.01); *F16D 55/225* (2013.01); *B66D 5/14* (2013.01); *F16D 2065/1312* (2013.01)

(56) References Cited

U.S. PATENT DOCUMENTS

| | | | |
|---|---|---|---|
| 4,696,377 A * | 9/1987 | Richardson | B66D 5/14 188/170 |
| 4,923,055 A | 5/1990 | Holland | |
| 5,007,505 A | 4/1991 | Lindegger | |
| 5,101,939 A | 4/1992 | Sheridan | |
| 5,944,150 A | 8/1999 | Hikari | |
| 6,146,303 A | 11/2000 | Wittur et al. | |
| 7,104,367 B2 | 9/2006 | Ferrand et al. | |
| 7,195,107 B2 | 3/2007 | Gauthier et al. | |
| 7,273,133 B2 | 9/2007 | Hisamitsu | |
| 7,428,951 B2 | 9/2008 | Ito | |
| 8,752,162 B2 | 6/2014 | Kuehr-McLaren et al. | |
| 8,752,262 B2 | 6/2014 | Davis et al. | |
| 10,253,513 B2 * | 4/2019 | Kennedy | E04G 23/0296 |
| 10,618,775 B2 * | 4/2020 | Davis, III | B66B 5/18 |
| 2011/0147129 A1 * | 6/2011 | Davis | B66D 5/14 187/254 |
| 2012/0153754 A1 | 6/2012 | Vincent et al. | |
| 2018/0141781 A1 | 5/2018 | Davis, III et al. | |

FOREIGN PATENT DOCUMENTS

| | | | |
|---|---|---|---|
| CN | 2232034 Y | 7/1996 | |
| CN | 2878320 Y | 3/2007 | |
| CN | 101327897 A | 12/2008 | |
| CN | 201385992 Y | 1/2010 | |
| CN | 201485220 U | 5/2010 | |
| CN | 201670680 U | 12/2010 | |
| CN | 103145061 A | 6/2013 | |
| CN | 104246277 A | 12/2014 | |
| CN | 204434176 U | 7/2015 | |
| CN | 204625062 U | 9/2015 | |
| CN | 108069356 A | 5/2018 | |
| DE | 3201107 A1 | 7/1983 | |
| DE | 29823371 U1 * | 6/1999 | ........... F16D 65/123 |
| DE | 29823371 U1 | 6/1999 | |
| DE | 202011052267 U1 | 3/2013 | |
| EP | 1717474 A1 | 11/2006 | |
| EP | 1982950 A1 | 10/2008 | |
| FR | 1189381 A | 10/1959 | |
| FR | 1189381 A * | 10/1959 | |
| GB | 1377917 | 12/1974 | |
| GB | 2049847 A | 12/1980 | |
| JP | S59169443 U | 11/1984 | |
| JP | H11335041 A | 12/1999 | |
| JP | 2002020064 A | 1/2002 | |
| JP | 3617771 B2 | 2/2005 | |
| KR | 20060063295 A | 6/2006 | |
| SU | 518588 | 11/1930 | |
| WO | 2005037702 A1 | 4/2005 | |

OTHER PUBLICATIONS

European Search Report for Application No. 17202159.4, dated Apr. 26, 2018; 10 pages.
CN 201711155214.6 Office Action; dated Apr. 16, 2020; 23 pages.

* cited by examiner

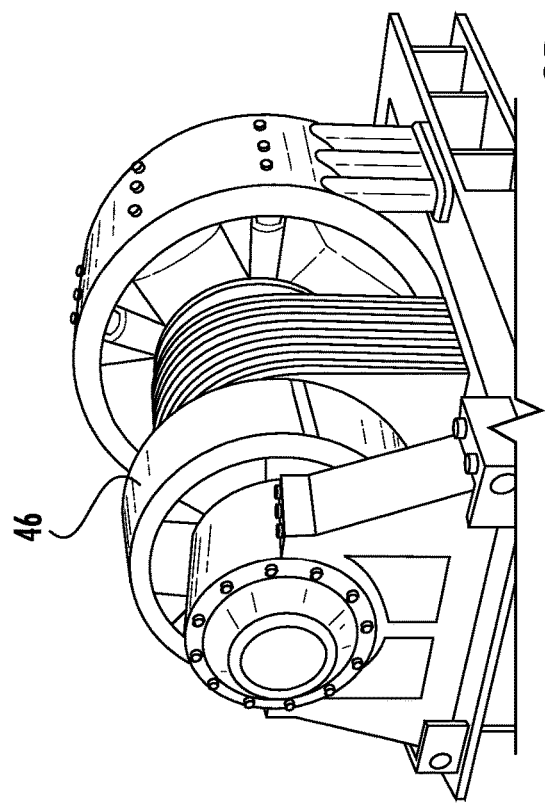
FIG. 2A BEFORE
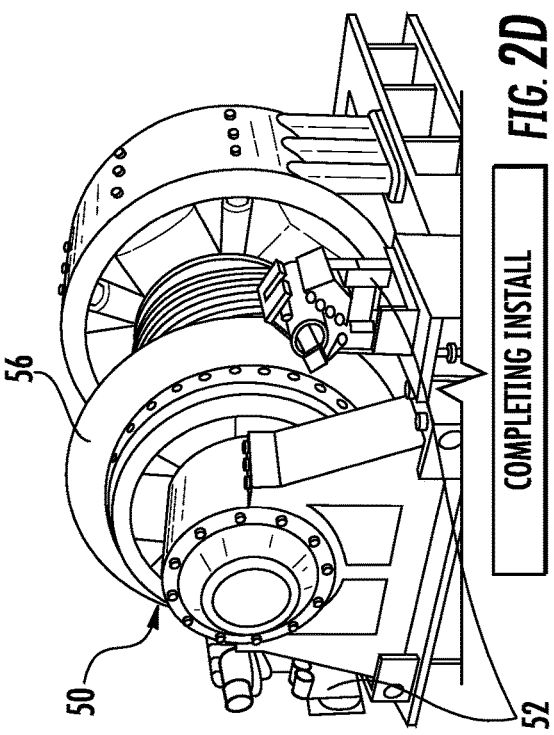
FIG. 2B EXISTING BRAKE REMOVED
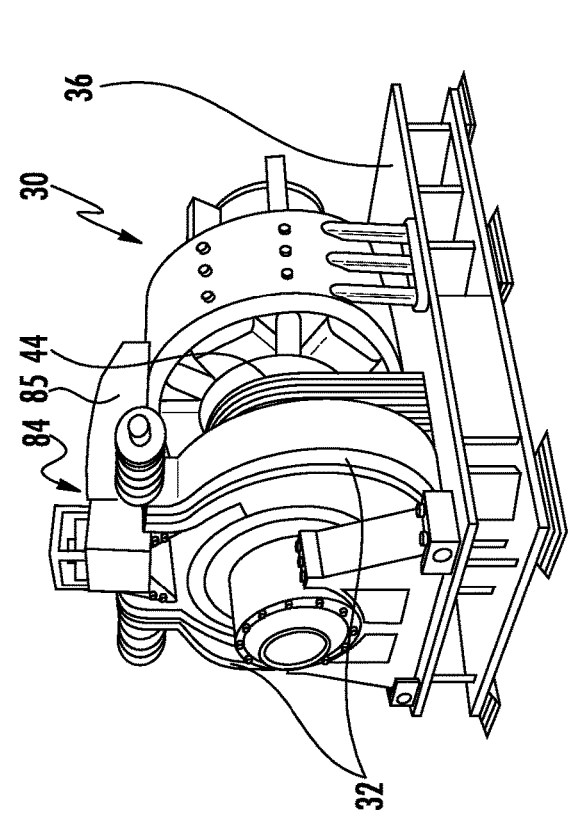
FIG. 2C NEW SPLIT DISK APPLIED
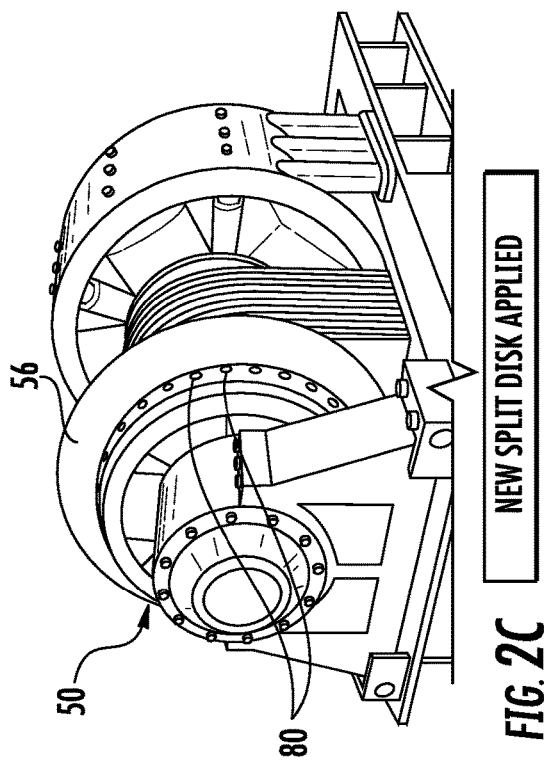
FIG. 2D COMPLETING INSTALL

4 CALIPERS

6 CALIPERS

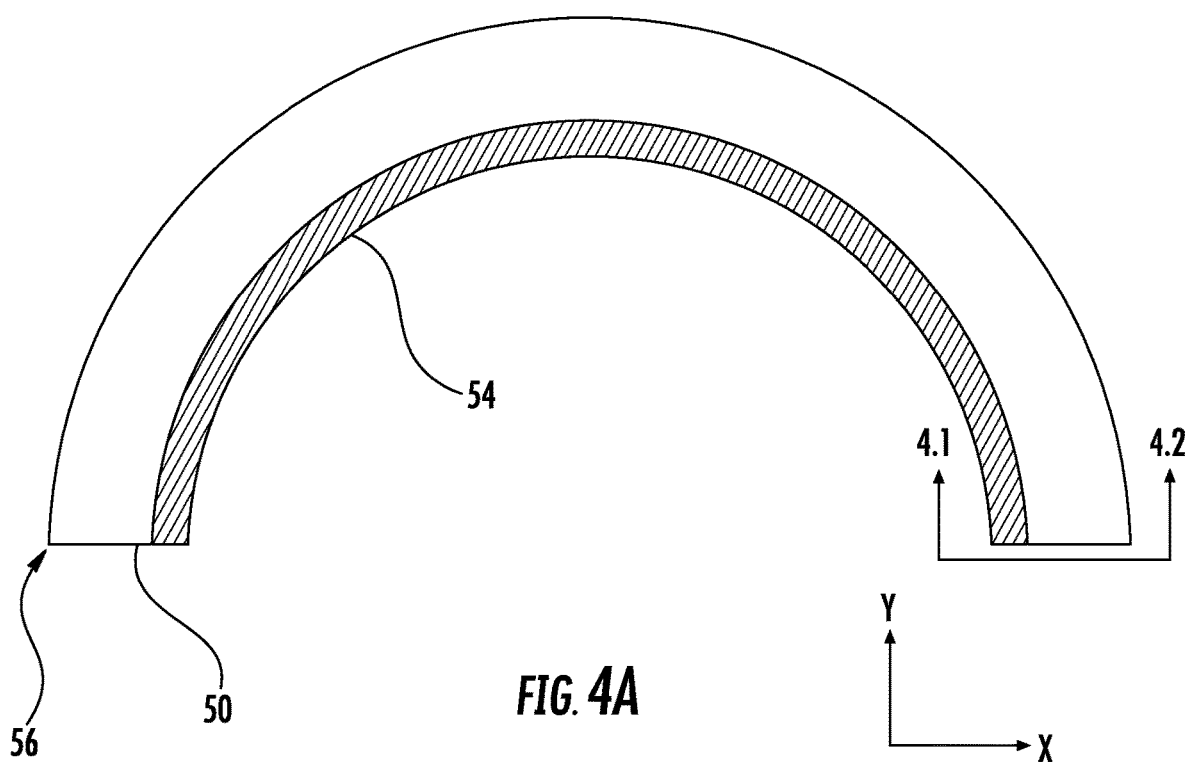
FIG. 4A
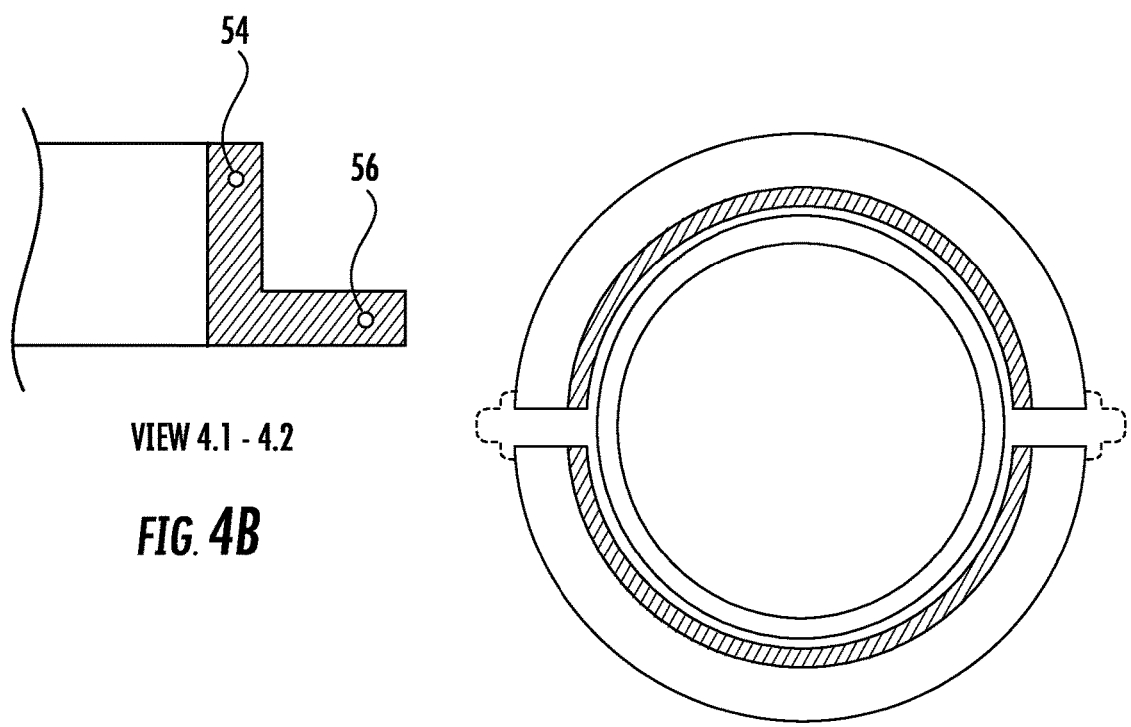
VIEW 4.1 - 4.2
FIG. 4B
FIG. 4C

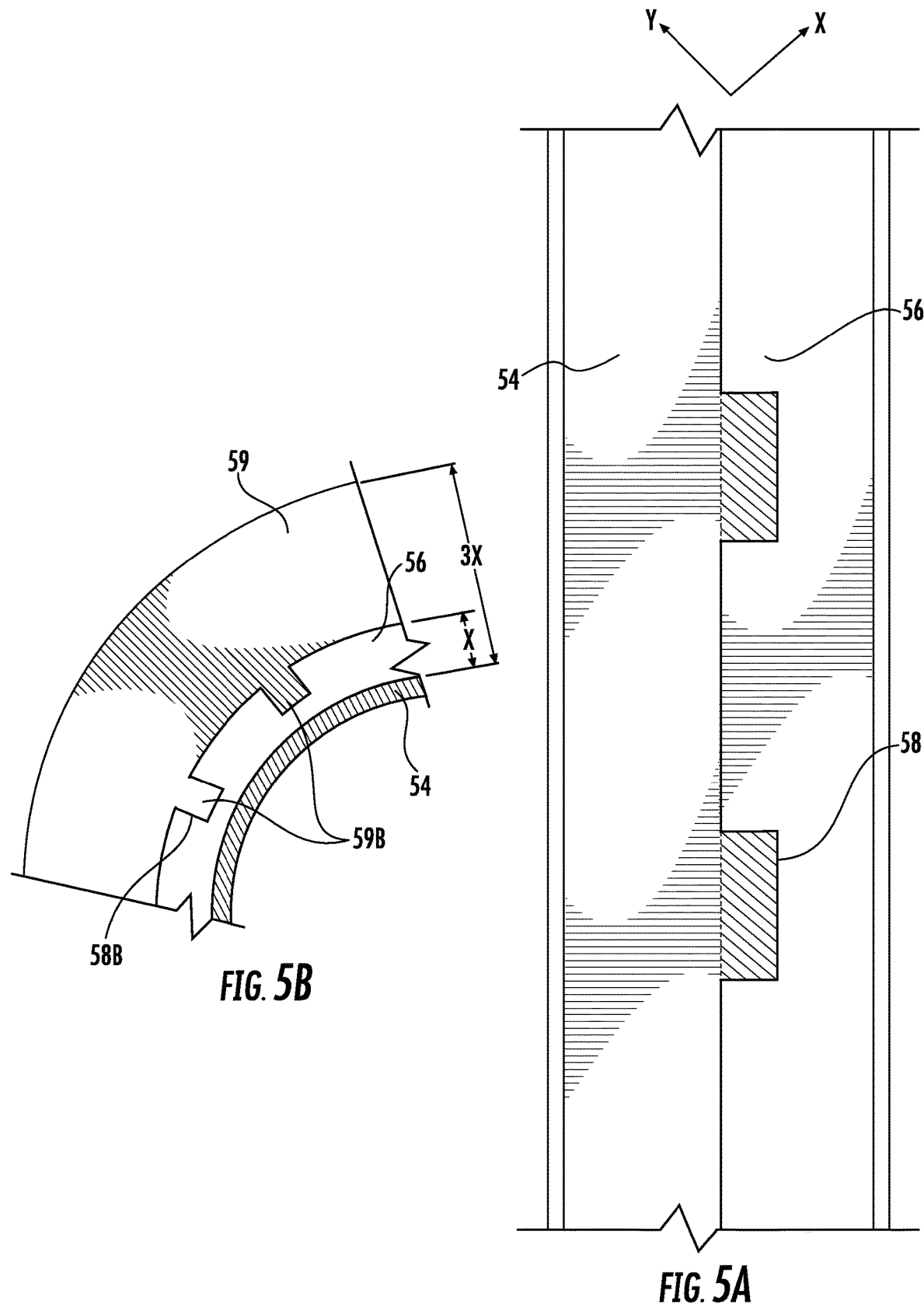

VIEW 6.1 - 6.2

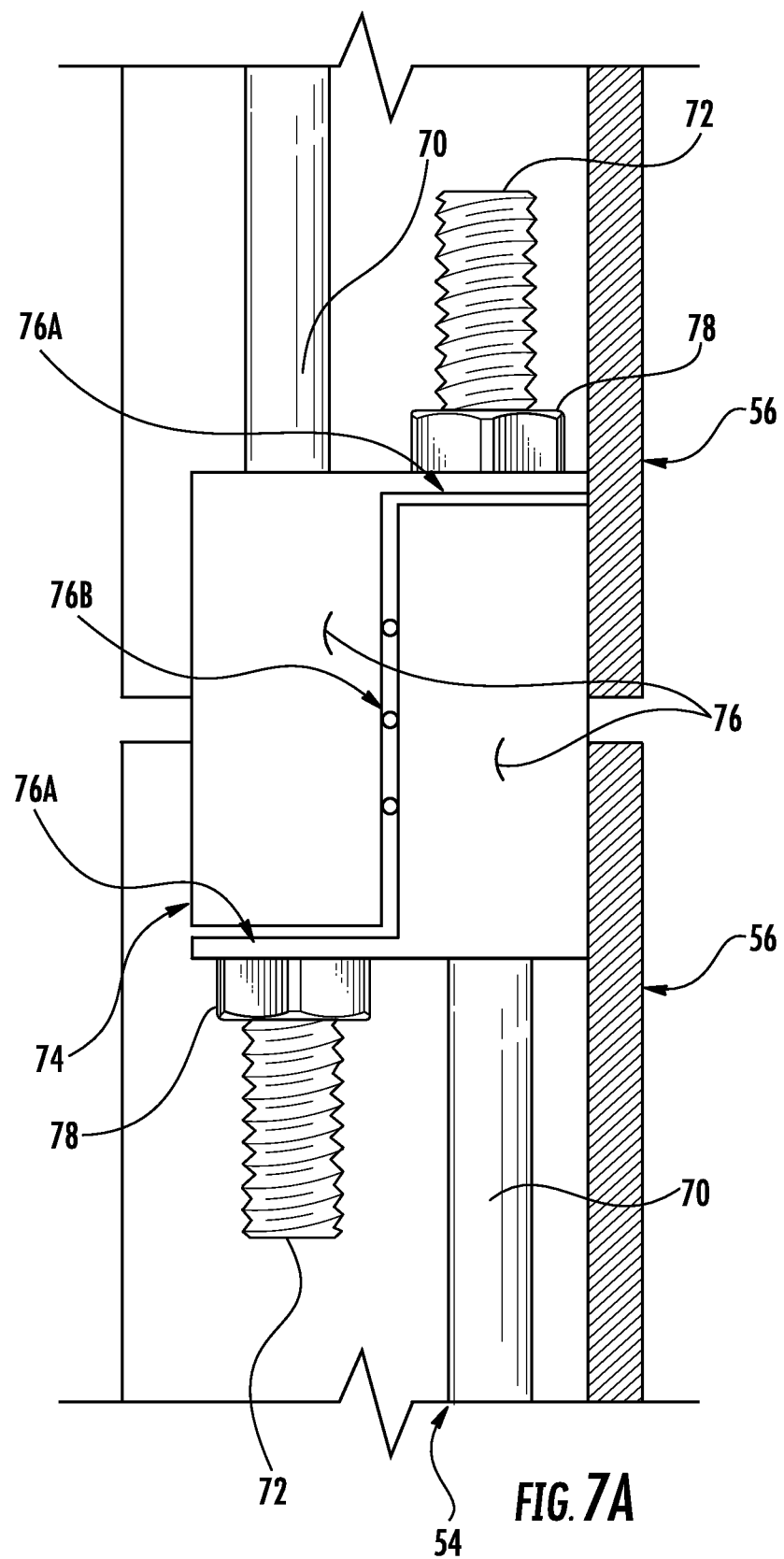

RETROFITTING AN ELEVATOR MACHINE WITH PRIMARY AND SECONDARY BRAKING

CROSS-REFERENCE TO RELATED APPLICATIONS

This application is a continuation of U.S. patent application Ser. No. 15/355,834 filed Nov. 18, 2016, the disclosure of which is incorporated herein by reference in its entirety.

BACKGROUND

Exemplary embodiments pertain to the art of retrofitting elevator machines with braking functionality.

Elevator systems are useful for carrying passengers between various levels in a building. There are various types of elevator systems. Some are referred to as traction-based systems because of reliance upon traction between a drive sheave and hoisting ropes to move and position the elevator car. Elevator machines in traction-based systems include a motor and a brake. There are a variety of known brake configurations.

Supplemental brakes for conventional elevator machines are known. Some elevator codes require braking functions that are not provided by older machines. Supplemental brakes can be added to meet such code requirements. One type of supplemental brake is referred to as a rope grabber because it provides a mechanism for clamping onto the roping arrangement. A rope grabber prevents the roping arrangement from moving, which maintains a position of an elevator car within a hoistway.

Rope grabber braking has drawbacks. One drawback is that the rope grabber system needs to be positioned below the elevator machine drive sheave. This requires taking up space within the hoistway or raising the elevator machine within a machine room for providing adequate spacing for the rope grabber system. Raising elevator machines is very costly, requires adequate clearance in the machine room, and may require new ropes. Such installation is cramped, resulting in limited accessibility for future service. Additionally, some elevator applications exceed the capability of existing rope grabbing devices, or have other space limitations. Rope grabbers, by applying braking forces directly onto the ropes, increase rope wear.

Other options to meet new braking requirements include replacing the existing elevator machine with a completely new machine, which includes the necessary braking capabilities. Such action, however, can be costly and time consuming, and results in wasting otherwise serviceable elevator machinery.

There is a need to enhance braking of installed elevators while eliminating the requirements of: (1) directly applying braking forces to elevator ropes; (2) mounting an additional braking device in the hoistway; (3) raising the elevator machine to accommodate proper braking; and (3) completely replacing elevator machinery, which results in unnecessary waste. On the other hand, there is a need for elevator machinery to include both a primary braking system and a secondary emergency braking system, per safety code requirements.

BRIEF DESCRIPTION

Disclosed is a method of retrofitting an elevator machine with primary and secondary braking, the machine being disposed on a machine support frame in an elevator machine room, and engaging one or more ropes for providing selective movement of an elevator car disposed in an elevator shaft, the machine having a drive sheave including a cylindrical brake drum, and brake components including dual brake arms; the method including: removing the brake components; affixing flanged disc segments about the drum and interlocking the flanged disc segments to form a brake rotor; and mounting respective brake calipers to frame mounts for providing primary and secondary braking to the elevator machine.

In addition to one or more of the features described above, or as an alternative, further embodiments may include that each flanged disc segment is formed from a rolled angle.

In addition to one or more of the features described above, or as an alternative, further embodiments may include that each flanged disc segment is formed by affixing together an annular band segment and an annular flange segment and providing therebetween a keyed connection.

In addition to one or more of the features described above, or as an alternative, further embodiments may include that the annular band segments and annular flange segments are welded and/or bolted together.

In addition to one or more of the features described above, or as an alternative, further embodiments may include that affixing each flanged disc segment to the drum includes connecting, to circumferentially adjacent ends of each flange, fastening members, and thereafter fastening together the fastening members.

In addition to one or more of the features described above, or as an alternative, further embodiments may include that the fastening members are circumferentially adjacent tubes, secured together via a bolt, at least one washer and a nut.

In addition to one or more of the features described above, or as an alternative, further embodiments may include that affixing each flanged disc to the drum includes wrapping a continuous rod around an outer diameter of the drum, clamping together the rod ends, and providing hoop compression with a parallel rod clamp.

In addition to one or more of the features described above, or as an alternative, further embodiments may include that the rod ends are threaded and the clamp includes tubes and tightening nuts.

In addition to one or more of the features described above, or as an alternative, further embodiments may include that each flanged disc segment includes disc guide holes, the drum includes matching drum guide holes, and affixing the flanged disc segments to the drum includes positioning guide members therethrough, for orienting each flanged disc segment against the drum.

In addition to one or more of the features described above, or as an alternative, further embodiments may include that the guide members are bolts or dowels.

In addition to one or more of the features described above, or as an alternative, further embodiments may include that mounting calipers includes mounting caliper mounting arms to the respective frame mounts, and mounting the calipers to the respective mounting arms.

In addition to one or more of the features described above, or as an alternative, further embodiments may include that the mounting arms each include a same number of calipers, circumferentially spaced about each arm by a mutually constant angle.

In addition to one or more of the features described above, or as an alternative, further embodiments may include that the machine includes a brake magnet housing with a spring guide rod, supported by via a brake magnet mount, and mounting calipers includes mounting an end of the mounting arms to respective opposing ends of the brake magnet housing or spring guide rod.

Further disclosed is an elevator machine, retrofitted with primary and secondary braking, the machine being disposed on a machine support frame in an elevator machine room, and engaging one or more ropes for providing selective movement of an elevator car disposed in an elevator shaft, the machine having a drive sheave including a cylindrical brake drum, and brake components including dual brake arms; the machine comprising: flanged disc segments, affixed about the drum and interlocked to form a brake rotor; and mounted, to frame mounts, respective brake calipers, for providing primary and secondary braking to the elevator machine.

In addition to one or more of the features described above, or as an alternative, further embodiments may include that each flanged disc segment is affixed to the drum by connecting, to circumferentially adjacent ends of each flange, fastening members, and thereafter fastening together the fastening members.

In addition to one or more of the features described above, or as an alternative, further embodiments may include that each flanged disc is affixed to the drum by wrapping a continuous rod around an outer diameter of the drum, clamping the rod ends, and providing hoop compression with a parallel rod clamp.

In addition to one or more of the features described above, or as an alternative, further embodiments may include that each flanged disc segment includes disc guide holes, the drum includes matching drum guide holes, and guide members are positioned therethrough, for orienting each flanged disc segment against the drum.

In addition to one or more of the features described above, or as an alternative, further embodiments may include caliper mounting arms, mounted to the respective frame mounts, and the calipers are mounted to the respective mounting arms.

In addition to one or more of the features described above, or as an alternative, further embodiments may include that the machine includes a brake magnet housing, with a spring guide rod, supported by a brake magnet mount, and an end of the mounting arms is mounted to respective opposing ends of the brake magnet housing or spring guide rod.

BRIEF DESCRIPTION OF THE DRAWINGS

The following descriptions should not be considered limiting in any way. With reference to the accompanying drawings, like elements are numbered alike:

FIGS. 2A-2D illustrate a method of retrofitting an elevator machine with primary and secondary braking capabilities, according to a disclosed embodiment;

FIG. 4A-4C illustrate a rotor component of a retrofitted elevator machine according to a disclosed embodiment;

FIGS. 5A-5B illustrate a rotor component of a retrofitted elevator machine according to another disclosed embodiment;

FIG. 7A-7C illustrate a component for connecting a rotor to a drum according to another disclosed embodiment;

DETAILED DESCRIPTION

A detailed description of one or more embodiments of the disclosed apparatus and method are presented herein by way of exemplification and not limitation with reference to the Figures.

The disclosed embodiments involve the removal, from the existing elevator machine, the singular machine brake. Thereafter, the application of a new split disc, or split ring (collectively referred to as the "split disc"), is provided to the outside face surface of the existing machine drive sheave, i.e., on the existing brake drum surface. Brake calipers are then mounted onto the existing machine bedplate structure or to caliper mounting arms. Brake pads are positioned to straddle the split disc.

The new split disc and brake calipers are sized to meet regulatory primary machine braking requirements. The same are sized, moreover, to meet regulatory secondary emergency braking requirements.

The primary benefits of the disclosed embodiments, for retrofitting an elevator machine with primary and secondary braking components, include: (1) the ability to perform a complete installation of the braking system in the machine room; (2) avoiding the need to raise, or re-rope the machine; (3) avoiding the direct application of braking/clamping forces to the ropes in order to achieve desired braking; (4) accessibility to the system for service remains the same as that for the machine; (5) avoiding the need to replace the entire elevator machine to provide the disclosed braking features; and (6) associated cost savings.

Figure 1:
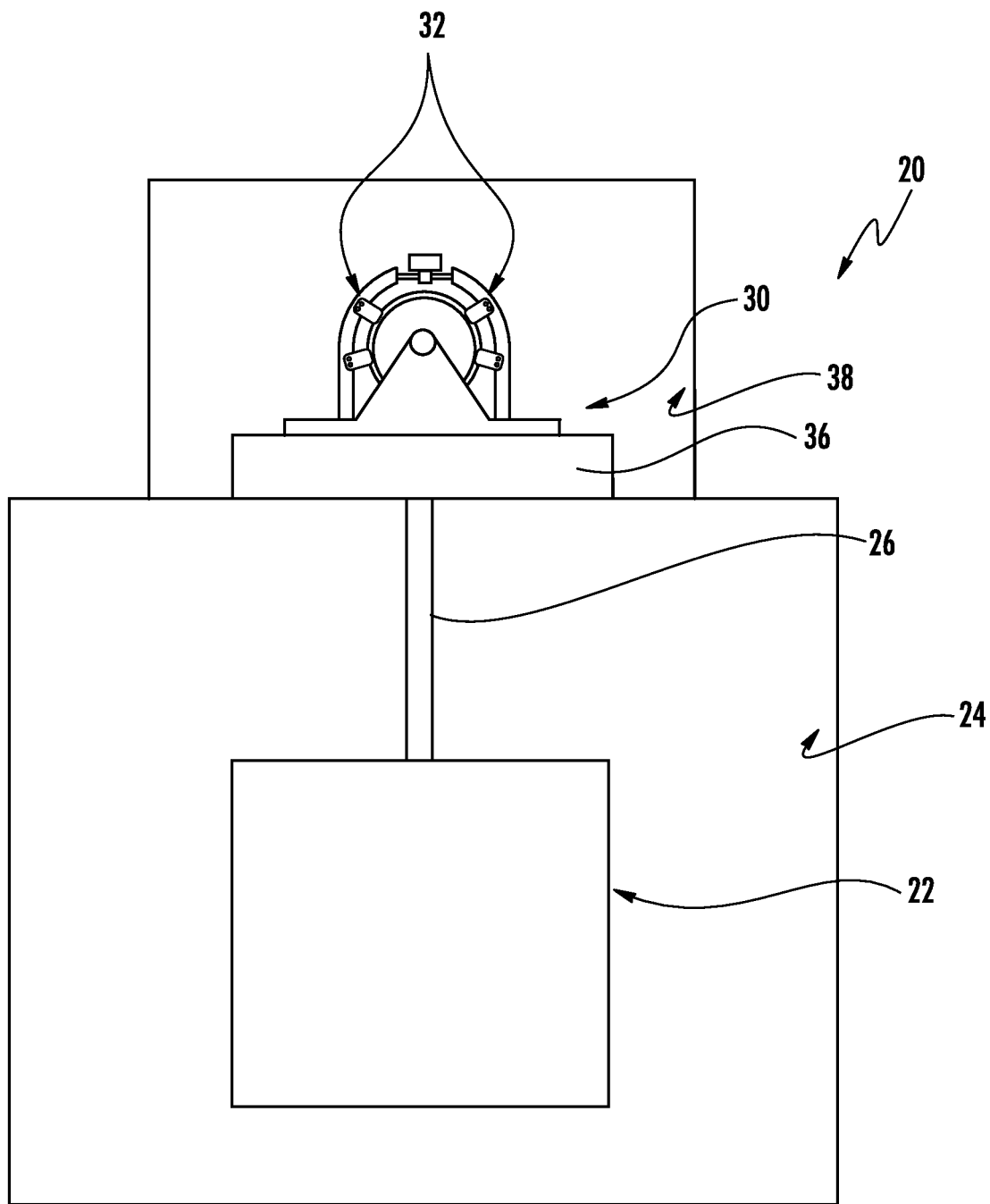
FIG. 1 illustrates an exemplary elevator system.

FIG. 1 schematically shows selected portions of an exemplary elevator system 20. An elevator car 22 is situated for movement within a shaft or hoistway 24. The elevator car 22 is supported by a roping arrangement 26.

An elevator machine 30 causes desired movement of the elevator car 22 to provide desired elevator service. The elevator machine 30, which could be a traction elevator machine, includes two brake arms 32 and related braking machinery (not shown). In the example of FIG. 1, the machine 30 is supported on a machine frame 36 within a machine room 38.

An example procedure for retrofitting the machine with a braking arrangement according to disclosed embodiments is described below.

As illustrated in FIGS. 1, 2A-2D and 3, a method is disclosed of retrofitting an elevator machine 30 with primary and secondary braking. The machine 30 has a drive sheave 44. The sheave 44 includes a cylindrical brake drum 46. The machine 30 also has brake components, including dual brake arms 32.

Figure 8A:
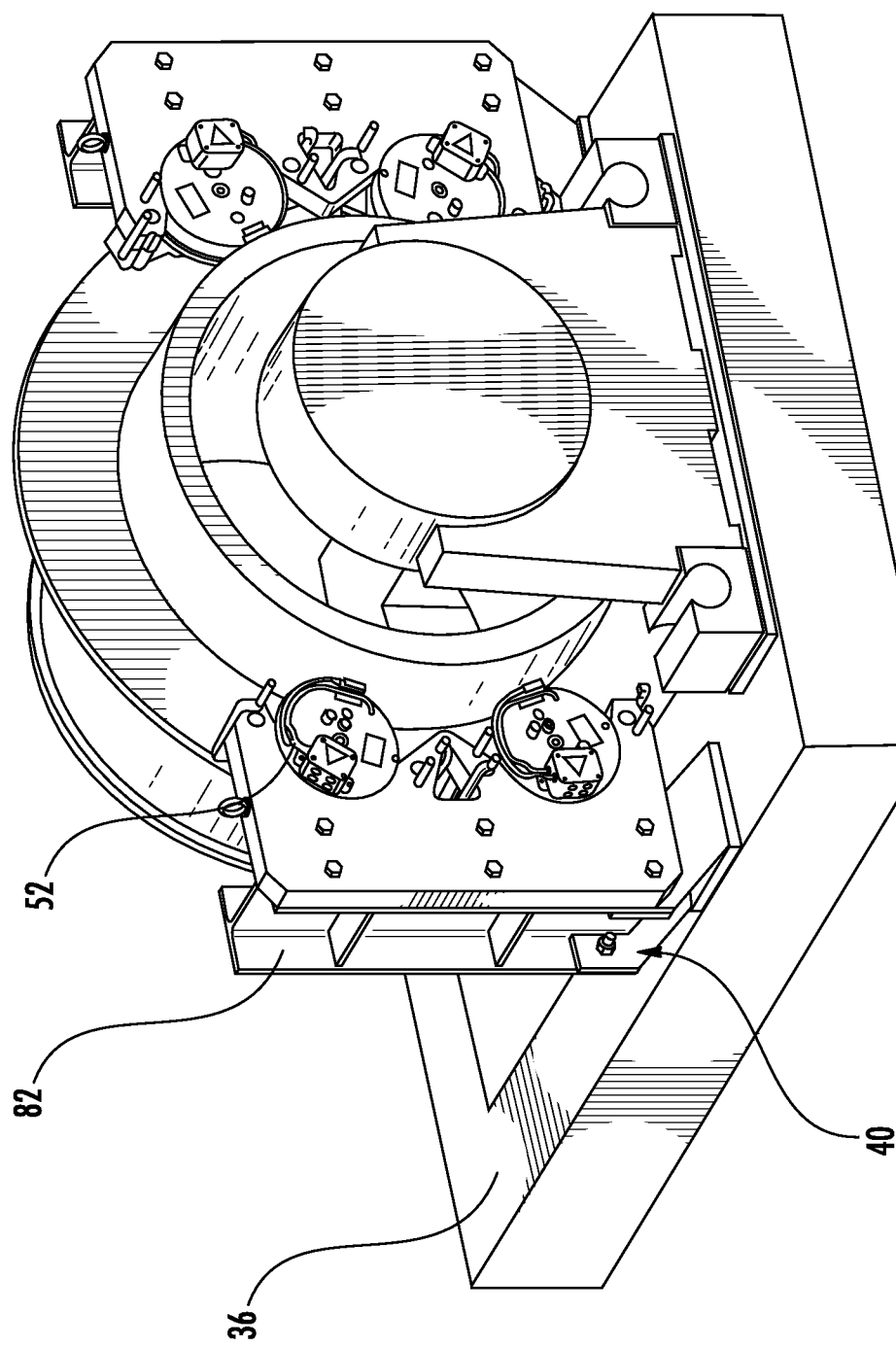
FIGS. 8A-8D illustrate an embodiment for mounting calipers to a frame.
Figure 8B:
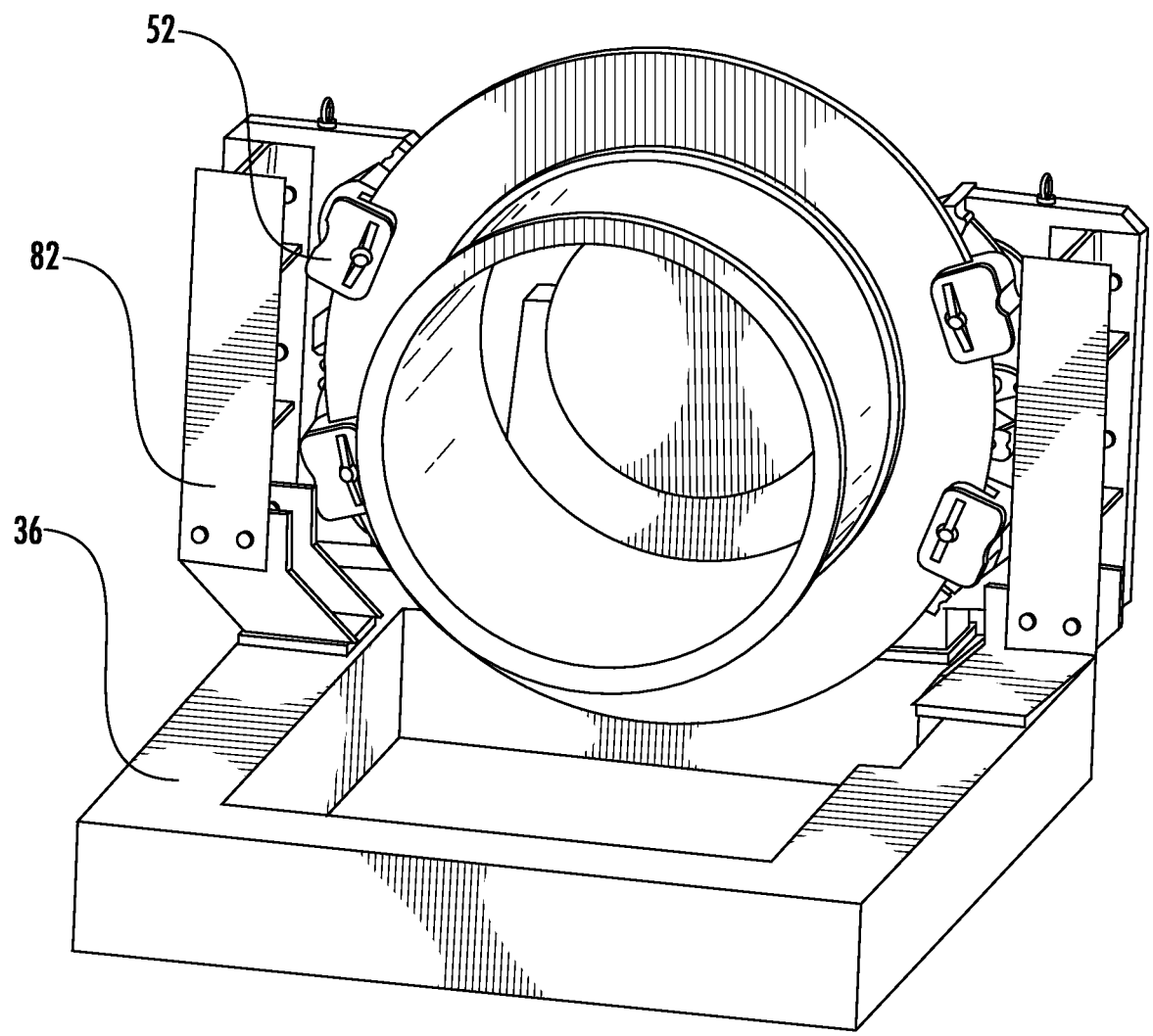
Figure 8D:
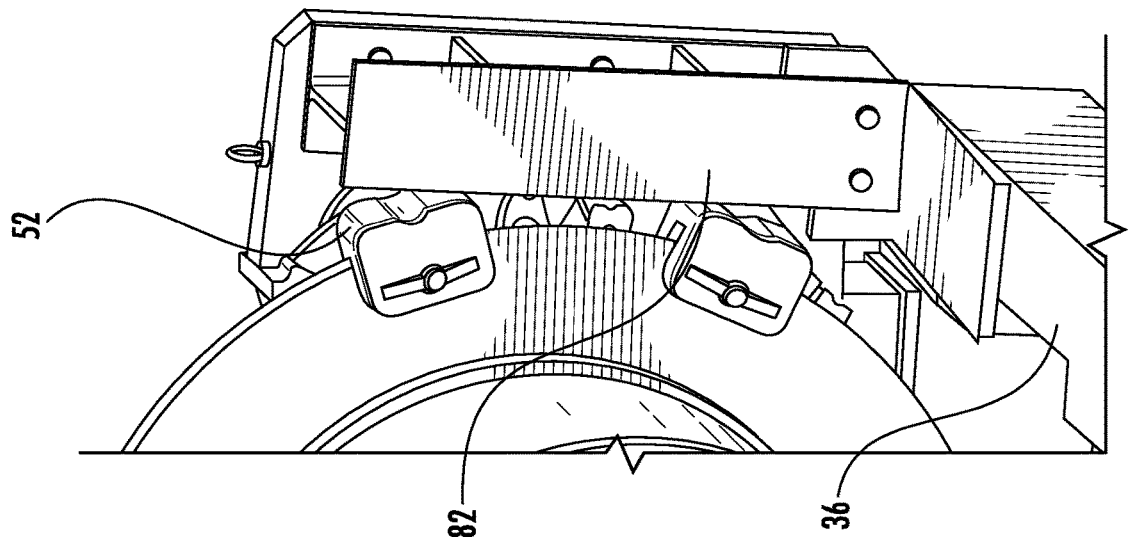
Figure 8C:
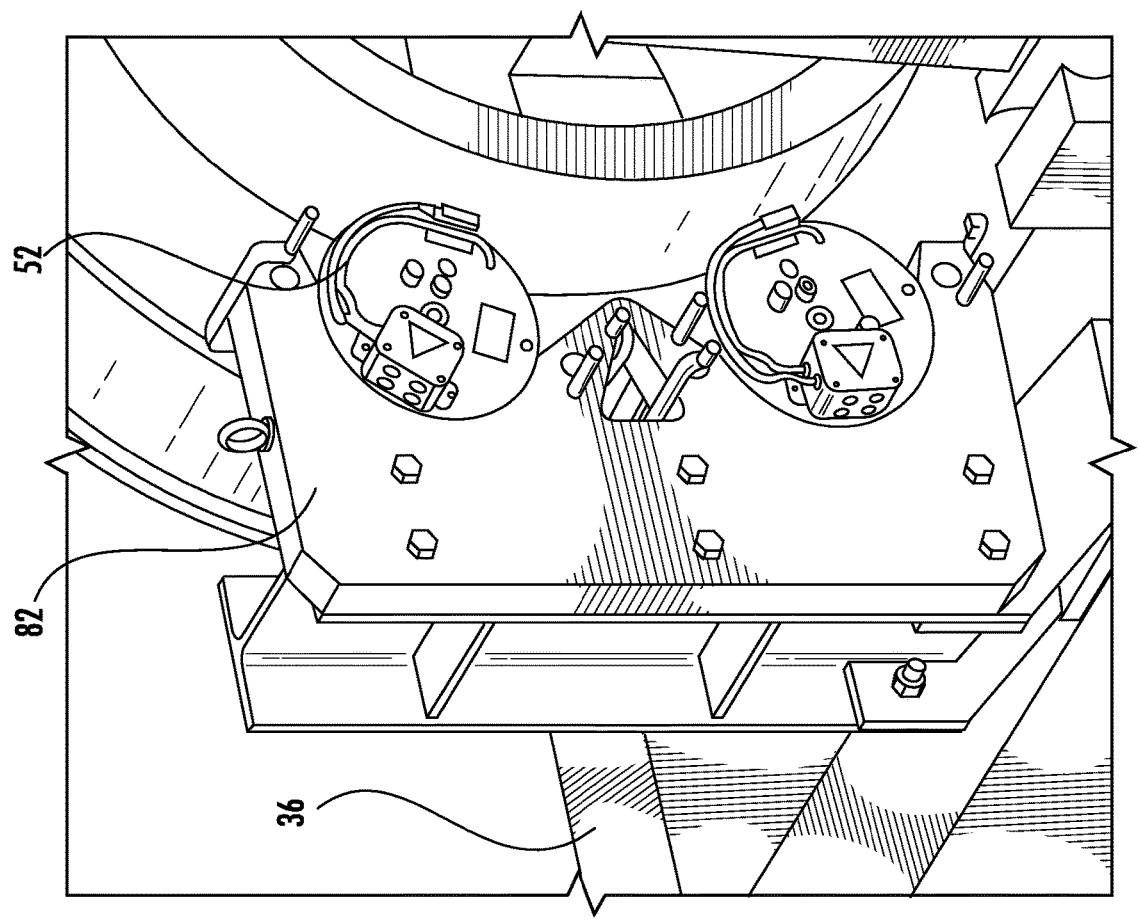

The machine 30 is installed on a machine support frame 36 in an elevator machine room 38. The frame 36 has a pair of frame connection mounts 40, illustrated schematically in FIG. 3A and illustrated structurally in FIG. 8A, disposed on opposing circumferential sides of the drum 46. The mounts 40 are designed to transfer brake loads to the frame 36. The machine 30 engages one or more ropes 26 for providing selective movement of an elevator car 22 disposed in an elevator shaft 24.

As illustrated in FIGS. 2C, 2D and 3, the method includes removing the brake components and affixing flanged disc segments 50 about the drum 46. In addition, the method includes interlocking the flanged disc segments 50 to form a brake rotor.

The method further includes mounting, to the frame connection mounts 40, respective brake calipers 52 (FIG. 2D). The calipers 52, mounted to both frame mounts 40, are capable of providing primary and secondary braking to the elevator machine 30.

As illustrated in FIGS. 4A-4C, and 5B, in one embodiment, each flanged disc segment 50 is formed from a rolled angle. One part of the rolled angle forms a band 54 of the flanged disc segment 50, which is positioned against the drum 46. The other part of the rolled angle is a flange 56, which forms the disc rotor. The rolled angle may be equal legged, or the flange 56 may be longer to provide a greater braking surface. In addition, the flange 56 may form a mounting surface for an additional, extension flange 59 (FIG. 5B), to form a larger rotor braking surface. For example, in FIG. 5B, the flange 56 has keyed portions 58B for receiving an additional toothed extension flange 59, extending radially outward from the flange 56. The extension flange 59 may be multiple times, e.g., three times, the radial length of the lower flange 56, so as to provide a suitable braking surface. The keyed portion 58B and toothed extensions 59B are connected via half-lap joints, formed with laps in the radial direction, with half-lap joints illustrated more clearly in FIGS. 12D and 13D, with embodiments (disclosed below) that form the laps in the circumferential direction, and the laps are structurally reinforced via bolting, welding or the like.

As illustrated in FIG. 5A, in one embodiment, each flanged disc segment 50 is formed by affixing together an annular band 54 and an annular flange 56. The annular band 54 is positioned against the drum 46 and the flange 56 forms the disc rotor. Provided therebetween is another half-lap, keyed connection 58, where the toothed sections are in the band 54 and the keyed sections are in the flange 56.

Figure 6A:
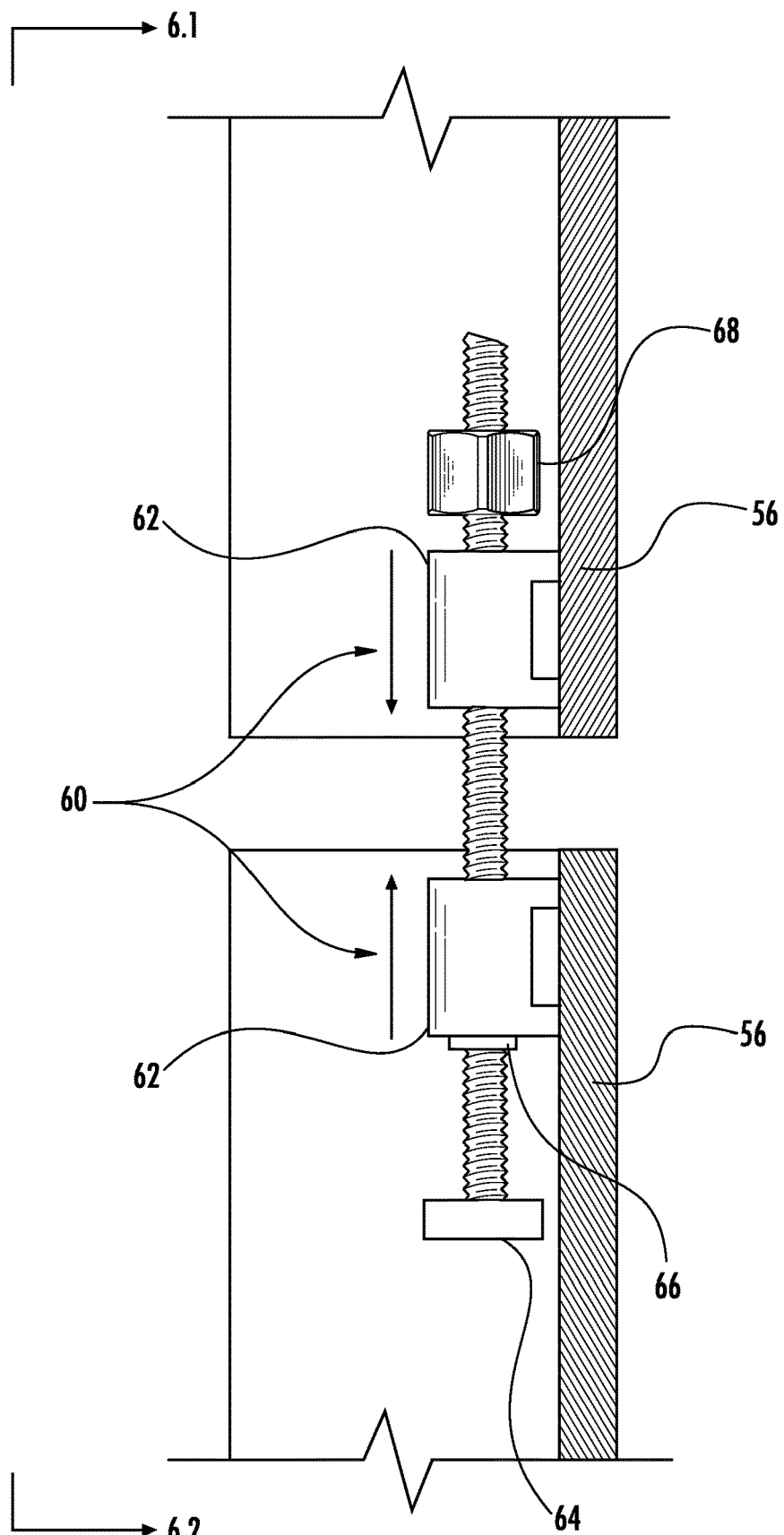
FIG. 6A-6B illustrate a component for connecting a rotor to a drum according to a disclosed embodiment.
Figure 6B:
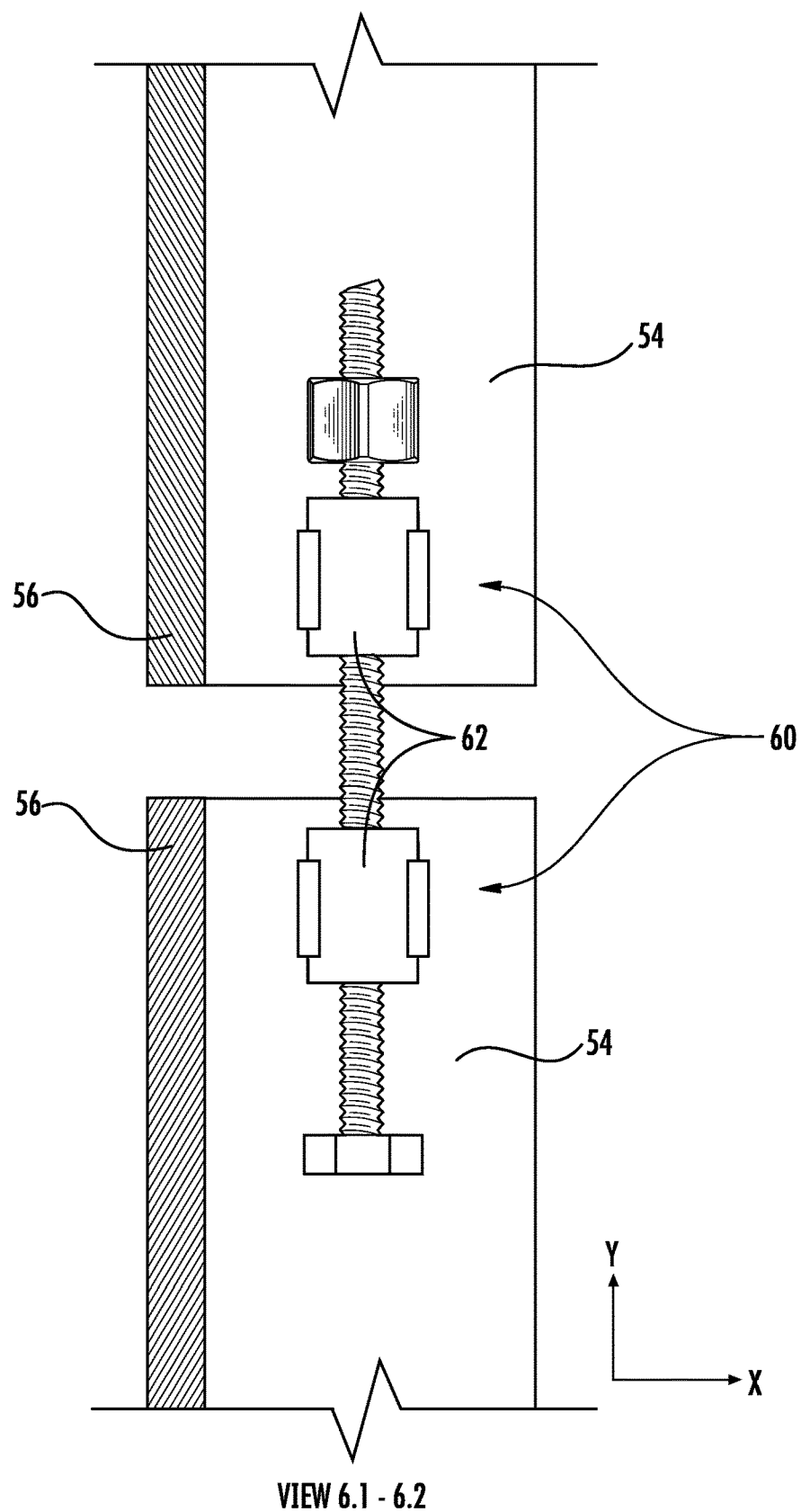

As illustrated in FIGS. 6A-6B, in one embodiment, the step of affixing each flanged disc segment 50 to the drum 46 includes connecting, to circumferentially adjacent ends of each flange 56 (FIG. 6A) or each band 54 (FIG. 6B), fastening members 60, which are then fastened together. In one embodiment, the fastening members 60 are tubes 62, secured via a bolt 64, at least one washer 66 and a nut 68. The effect of this embodiment is to bias the flanged disc segments 50 against the drum 46.

Figure 7B:
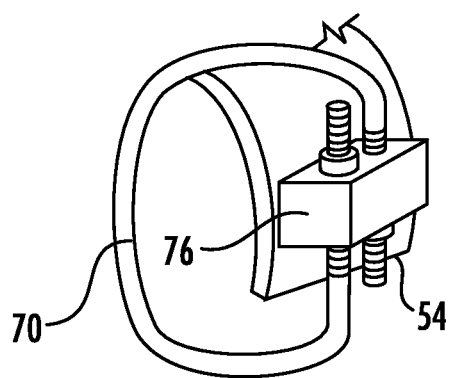
Figure 7C:
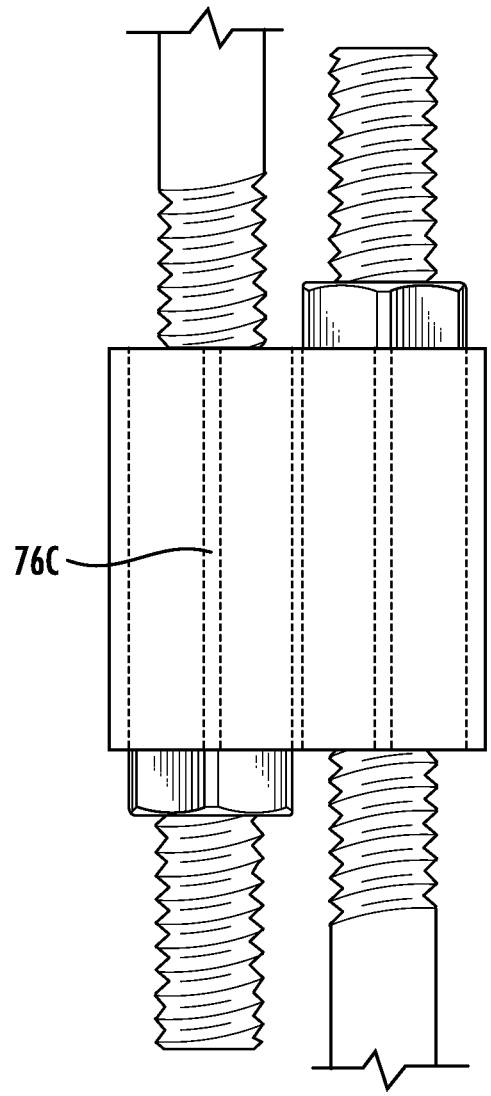

As illustrated FIGS. 7A-7C, in another embodiment, the biasing effect occurs, e.g., via a hose clamp configuration (FIG. 7B). This is implanted by wrapping a continuous rod 70 around an outer diameter of the drum 46, clamping the rod ends 72, and providing hoop compression, via a parallel rod clamp 74. In one embodiment, the rod ends 72 are threaded and the clamp includes tubes 76 and tightening nuts 78. In one embodiment, as illustrated in FIG. 7A, the connector tubes 76 are separate structures, bolted to the rod 70 at tube ends 76A, and bearings 76B can be utilized to assist in the compression of the rod 70. Alternatively, as illustrated in FIG. 7C, the connector 76C can be a single, integrated, double tubed structure.

Turing back to FIG. 2C, in one embodiment, each flanged disc segment 50 includes band guide holes 80, and the drum 46 includes matching drum guide holes (not shown), for orienting each flanged disc segment 50 against the drum 46. In this embodiment, the step of affixing the flanged disc segments 50 to the drum 46 includes positioning guide members, which could be bolts, dowels or the like, through the band 54 and drum guide holes.

Turning back to FIGS. 3A-3C, in one embodiment, the step of mounting calipers 52 includes mounting arcuate mounting arms 82, illustrated schematically, to the respective frame mounts 40. In this embodiment, the mounting step includes mounting the calipers 52 to the respective mounting arms 82. In addition, the mounting arms 82 each include a same number of calipers 52. The calipers 52 are separated on each mounting arm 82 by an angle 83 about the disc circumference to provide an even brake force distribution. To achieve proper angling, the arms 82 may be arcuate.

As illustrated, on each vertical half of the rotor 46, e.g., left and right halves, circumferentially adjacent calipers may be separated by a substantially constant angle. Also as illustrated, pairs of calipers on opposing vertical halves of the rotor 46 may be disposed on a common axis. This is illustrated with e.g., calipers C1 and C4 in the four caliper configuration (FIG. 3B) and C1 and C6 in the six caliper configuration (FIG. 3C). Further, in the six calipers configuration, a center or middle caliper C2, C5 on each vertical half of the rotor 46 may be disposed on the rotor 46 center horizontal axis. With two calipers on each side (FIG. 3B), the rotor 46 center horizontal axis bisects the angle between circumferentially adjacent calipers, e.g., C1, C2. Additional configurations are within the scope of the disclosure.

Figure 3A:
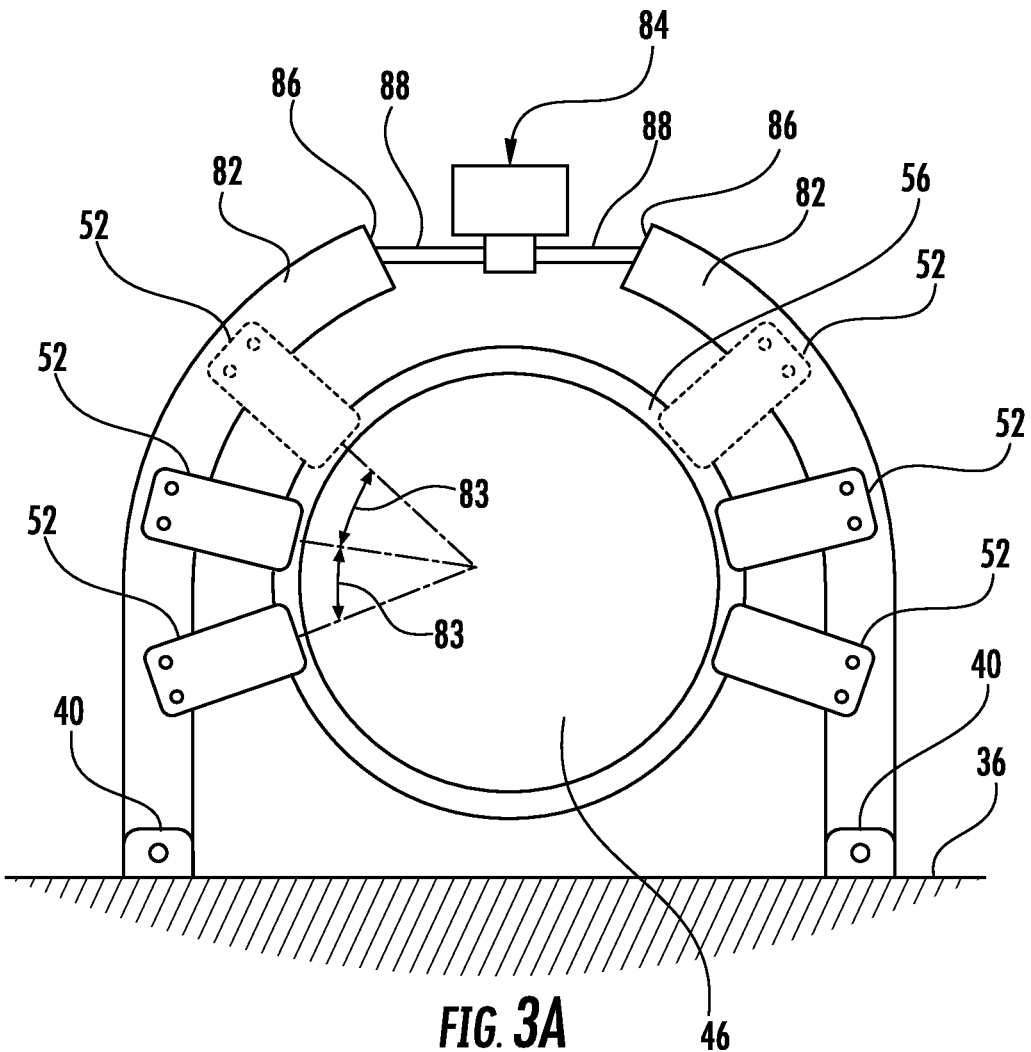
FIG. 3A-3C illustrate a retrofitted elevator machine according to a disclosed embodiment.
Figure 3B:
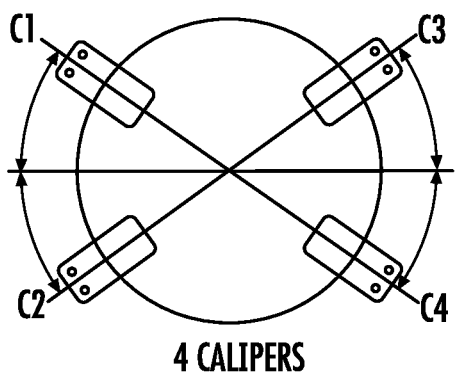
Figure 3C:
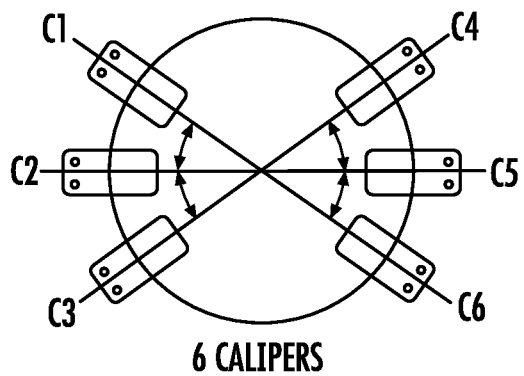

As illustrated in FIGS. 3A-3C, the machine includes a legacy brake magnet housing 84, with a horizontally extending spring guide rod 88. The housing 84 is supported by the machine structure via a brake magnet mount 85 (FIG. 2A), which essentially is a cast iron box. In one embodiment, the step of mounting calipers 52 includes mounting an end 86 of the mounting arms 82 to opposing sides of the magnet housing 84 or spring guide rod 88.

In addition to the above method for retrofitting a machine, an elevator machine 30 retrofitted by the above method is considered part of the disclosure. Turning to FIGS. 8A-8D, an embodiment is illustrated for mounting calipers 52 to the frame 36, with a pair of caliper mounting arms 82, i.e., each including a pair of calipers 52. The absence, or removal, of brake magnet housing 84, illustrated in the above disclosed embodiments, leaves the mounting arms 82 without a central support. Thus the mounting arms 82 are built stiffly enough to carry the loads using, e.g., I-beam supports. With this embodiment, the mounting arms 82 must be removed in order to change brake pads.

Figure 9A:
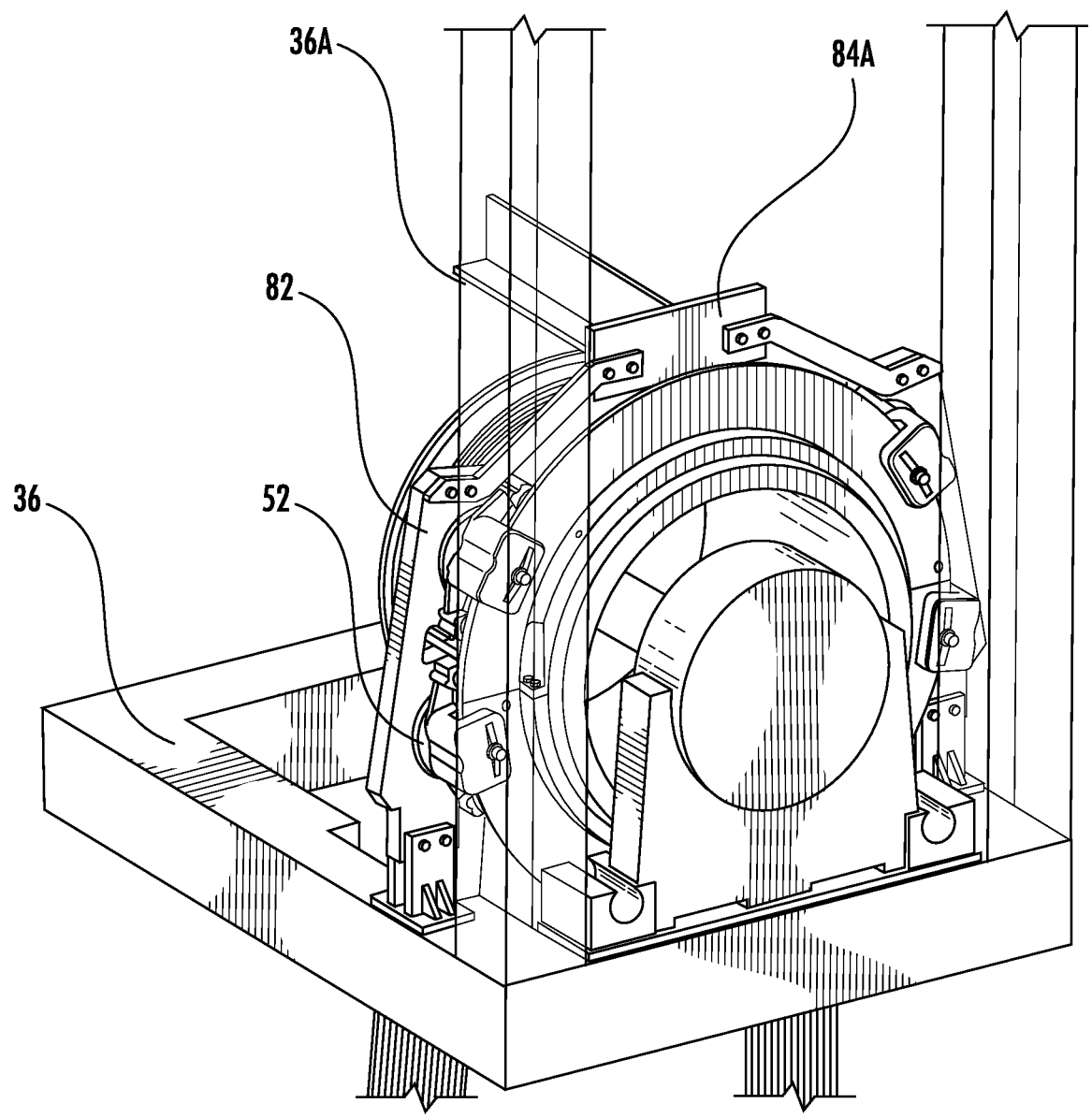
FIGS. 9A-9F illustrate another embodiment for mounting calipers to a frame.
Figure 9B:
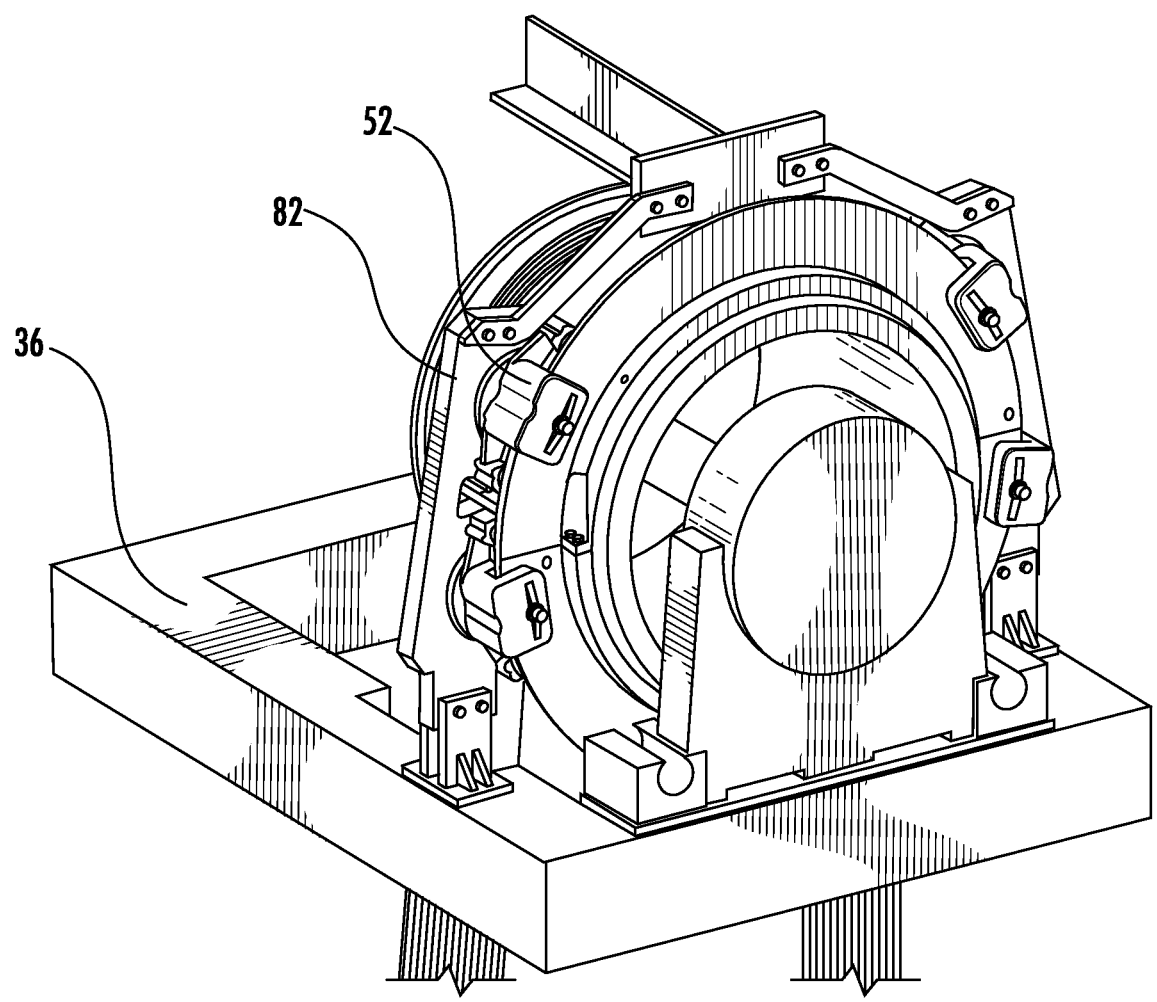
Figure 9C:
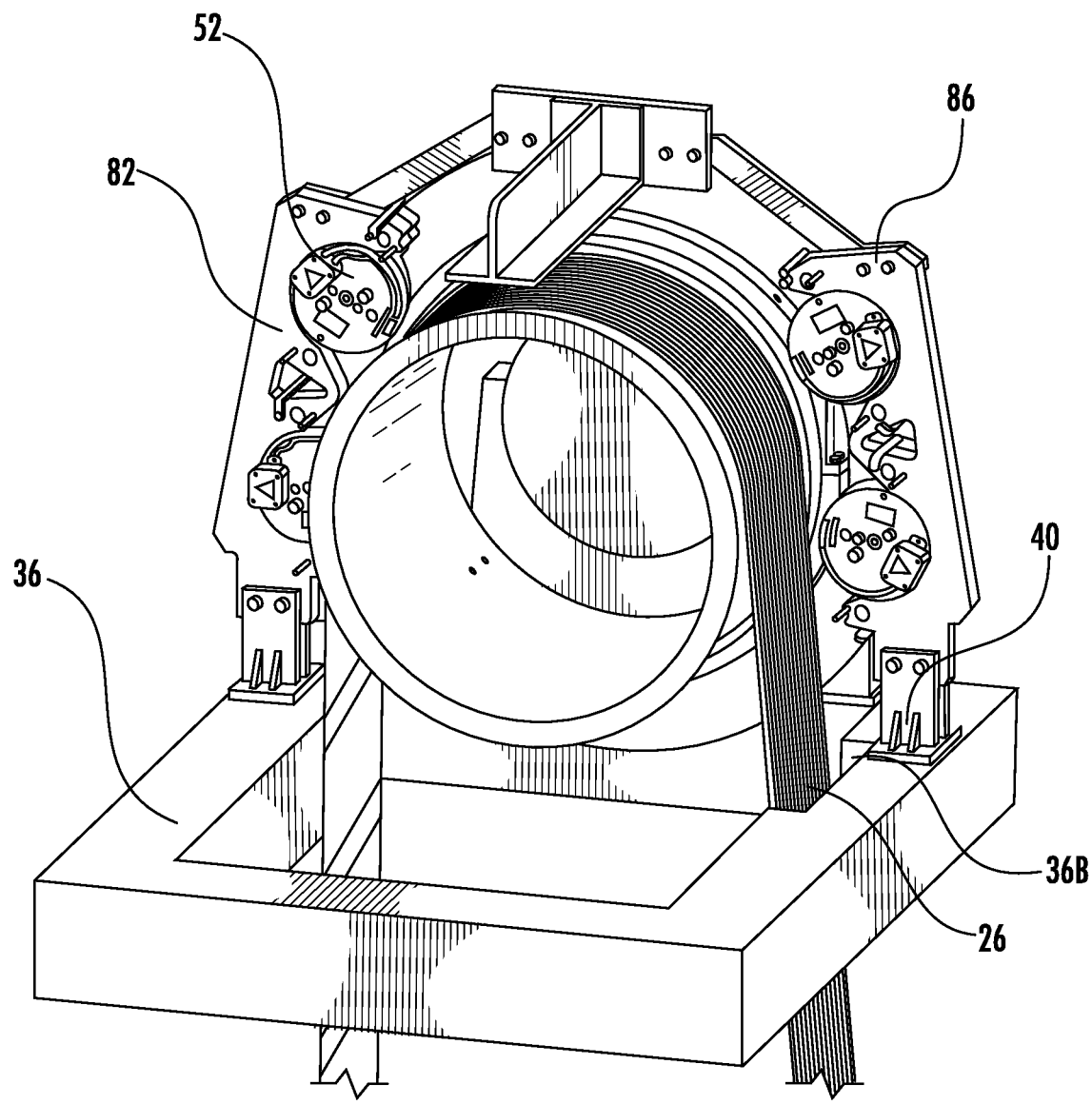
Figure 9D:
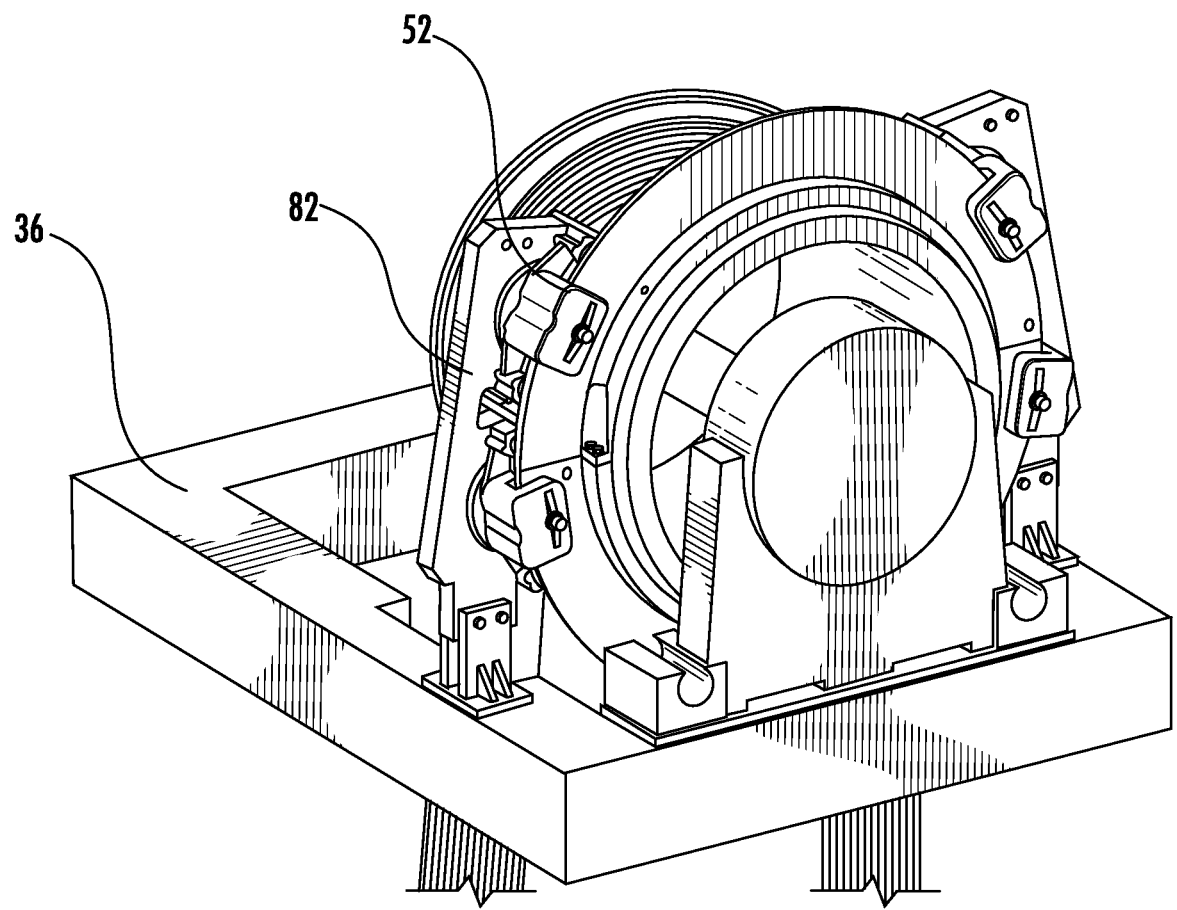
Figure 9F:
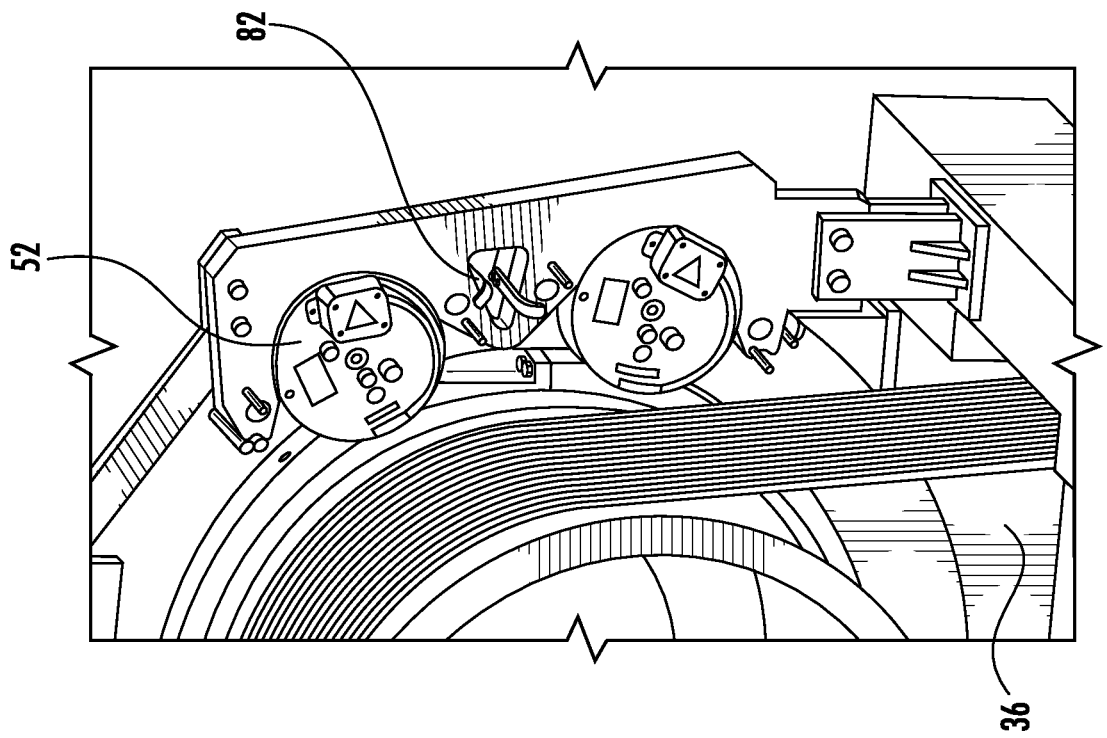
Figure 9E:
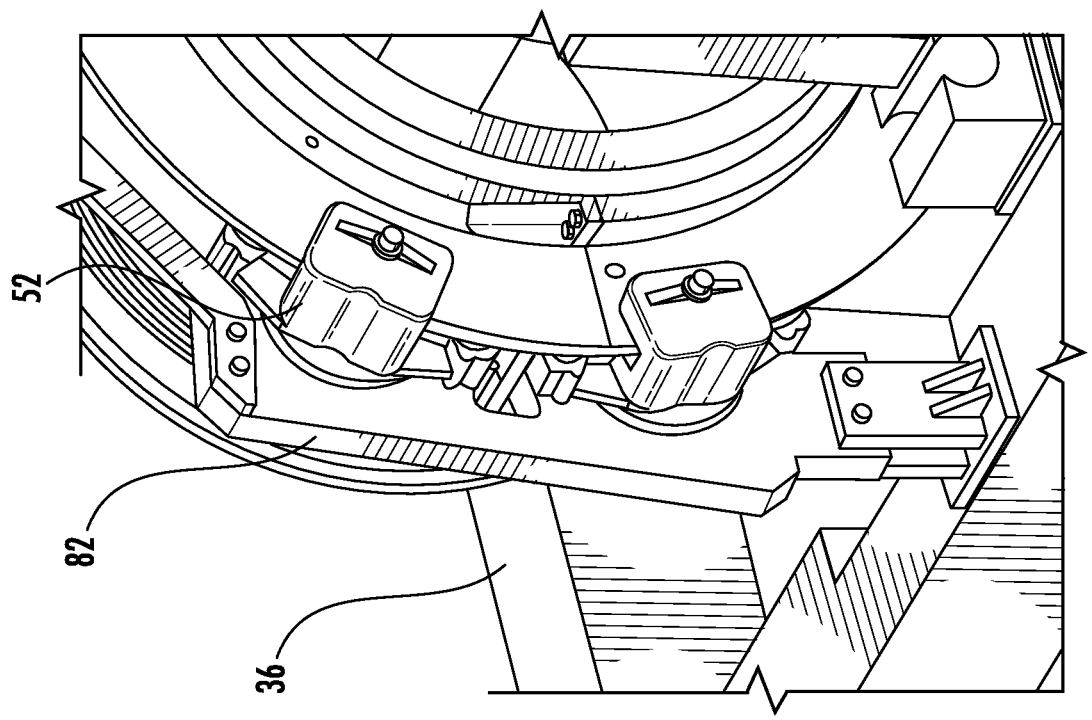

Turning to FIGS. 9A-9F, another embodiment is illustrated for mounting calipers 52 to a frame 36, with a pair of caliper mounting arms 82, i.e., each including a pair of calipers 52. In this embodiment, with the absence, or removal, of the brake magnet housing 84, an additional frame mounted central support 84A is provided connected to ends 86 (FIG. 9C) of the mounting arms 82. The mounting arms 82, may therefore be slender compared with the arms 82 in the embodiment illustrated in FIGS. 8A-8D. This configuration is preferred, e.g., where space is limited. For example, where the frame 36 has additional vertical supports 36A (FIG. 9A), the forward space for mounting stiffer mounting arms 82 may be unavailable. Here too, the mounting arms 82 must be removed in order to change brake pads. As illustrated in FIG. 9C, the frame mount 40 extends slightly past envelope of the elevator machine 30, e.g., spaced from a frame notch 36B, in order to not interfere with rope drop in ropes 26.

Figure 10A:
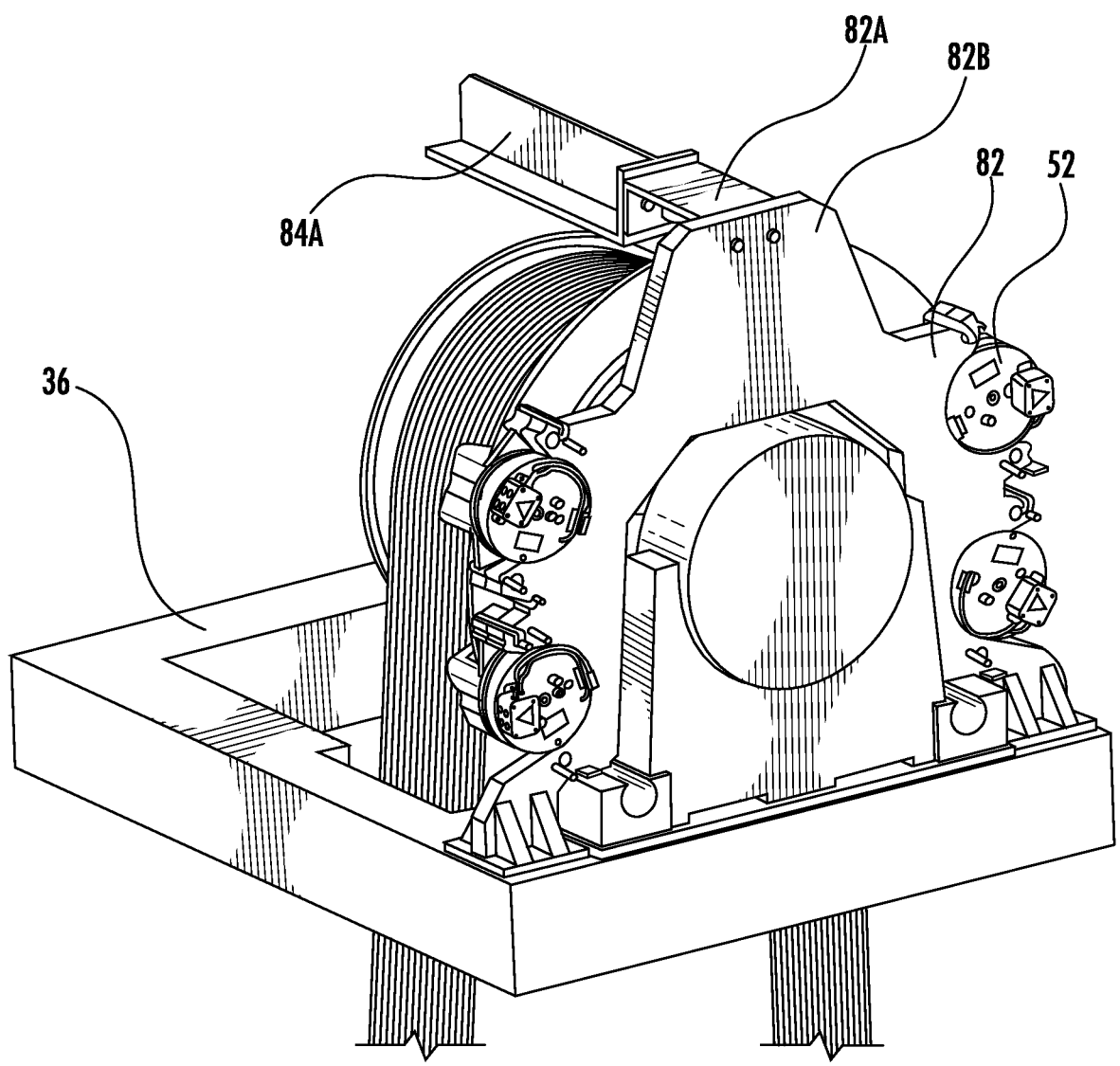
FIGS. 10A-10C illustrate another embodiment for mounting calipers to a frame.
Figure 10B:
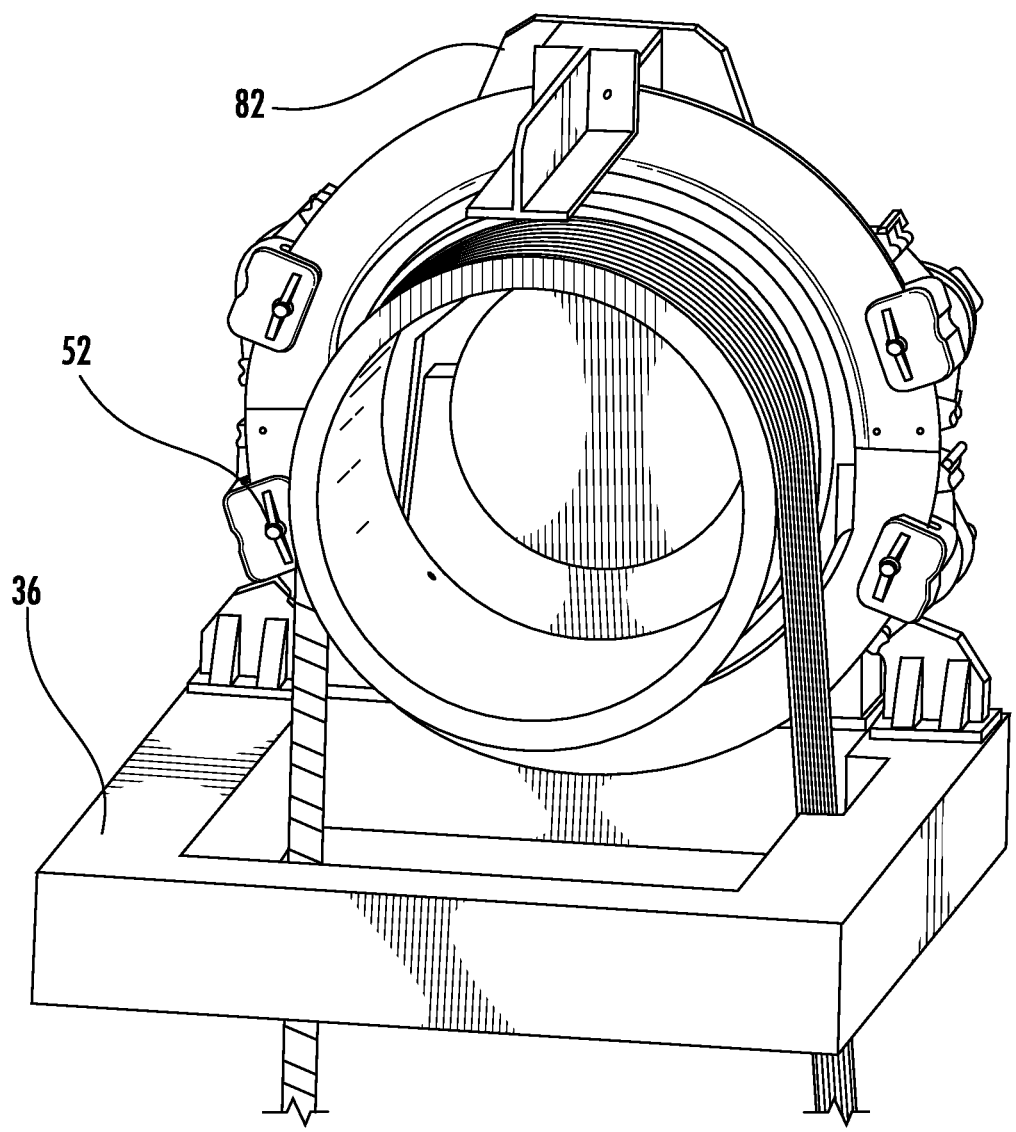
Figure 10C:
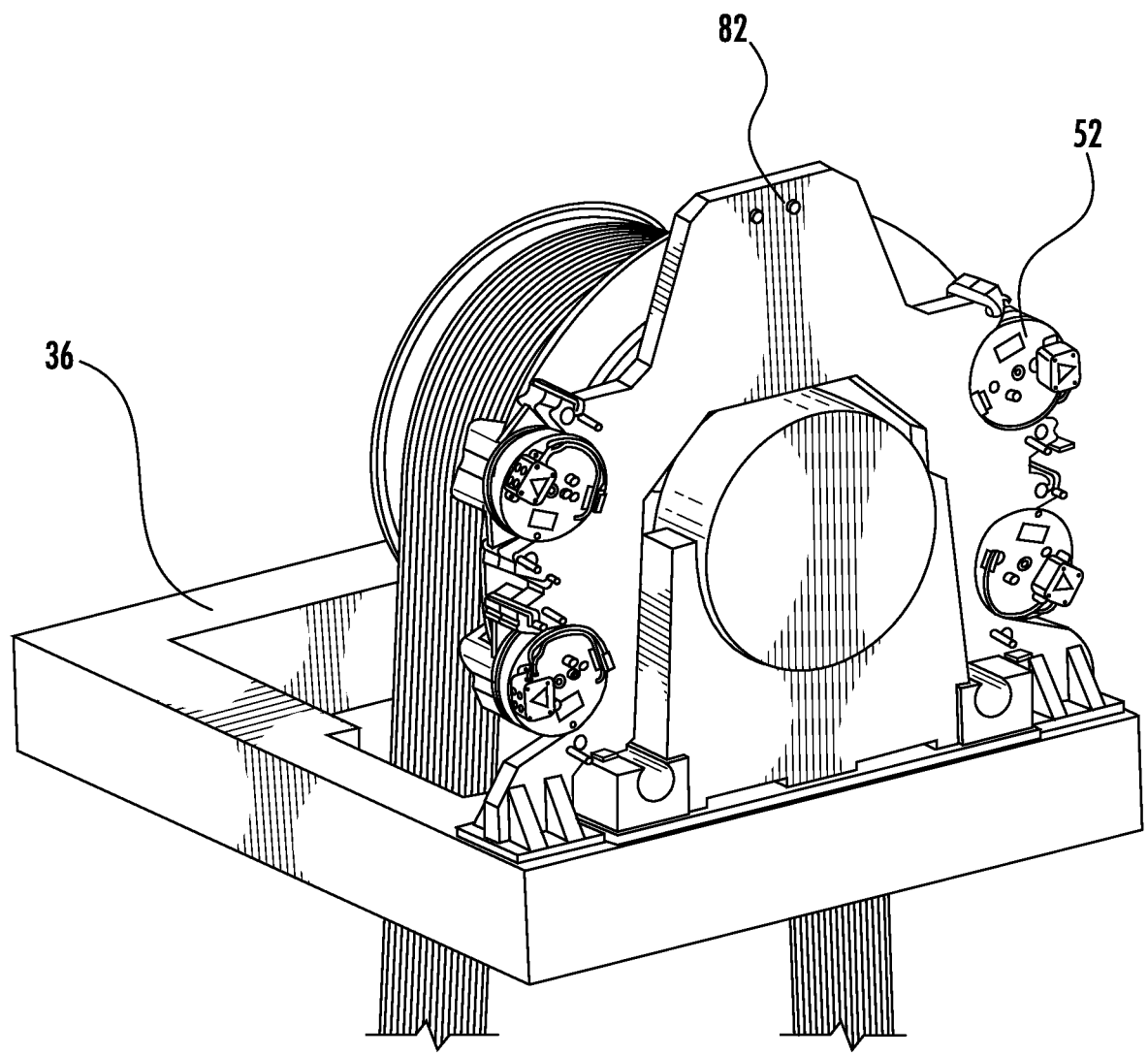

Turning to FIGS. 10A-10C, another embodiment is illustrated for mounting calipers 52 to a frame 36, with a caliper unitary mounting structure 82, illustrated with four calipers 52. In this embodiment, again with the absence, or removal, of a brake magnet housing 84, an additional frame mounted central support 84A is provided. The support 84A is connected to a rearward extending bracket 82A attached to a joining apex 82B of the caliper mounting structure 82. The mounting structure 82 may therefore be slender, similar to arms 82 illustrated above in FIGS. 9A-9F. In this embodiment, the mounting structure 82 need not be removed to change brake pads.

Figure 11A:
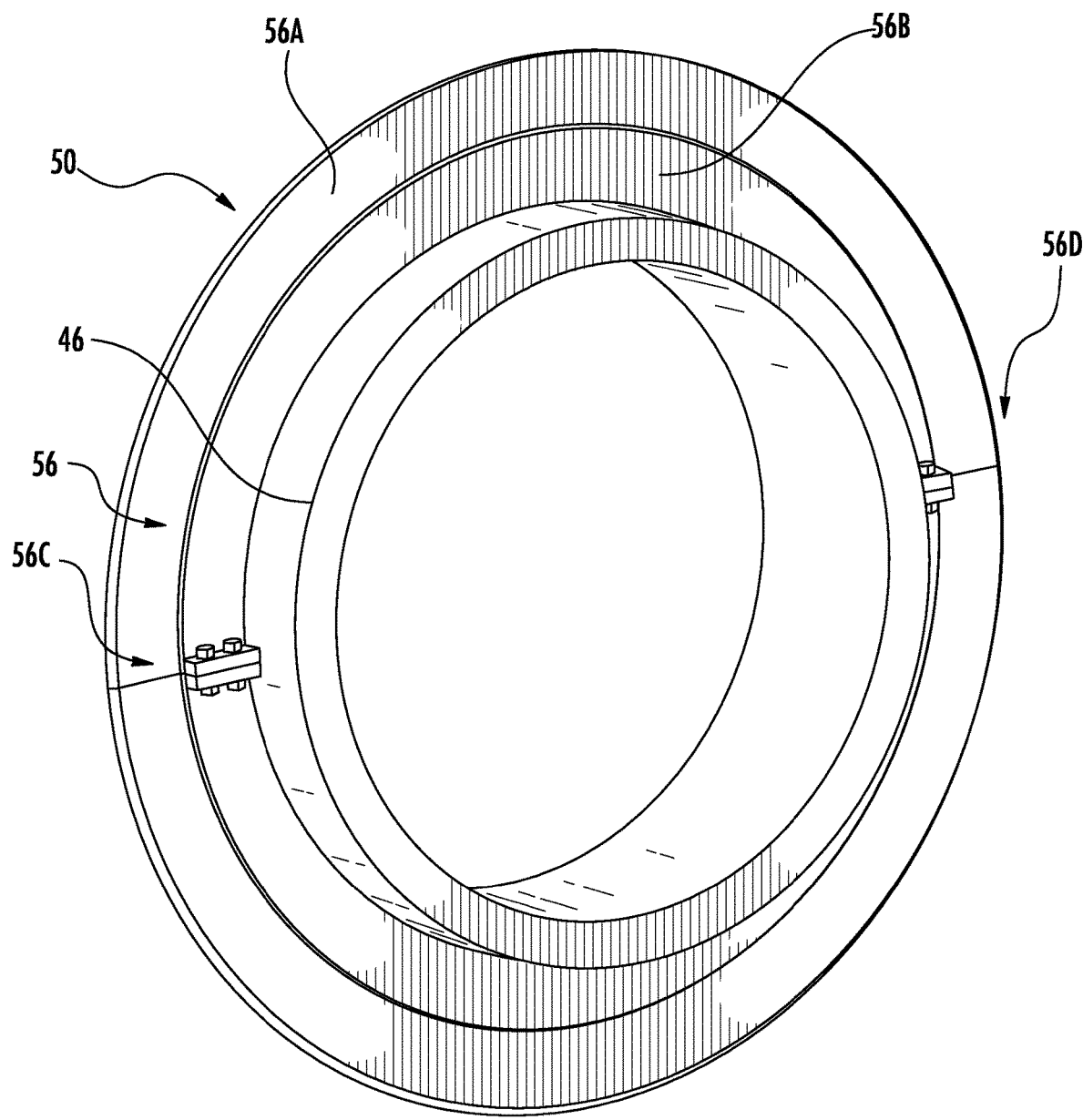
FIGS. 11A-11B illustrate an embodiment for attaching the disk to the drum of the elevator machine.
Figure 11B:
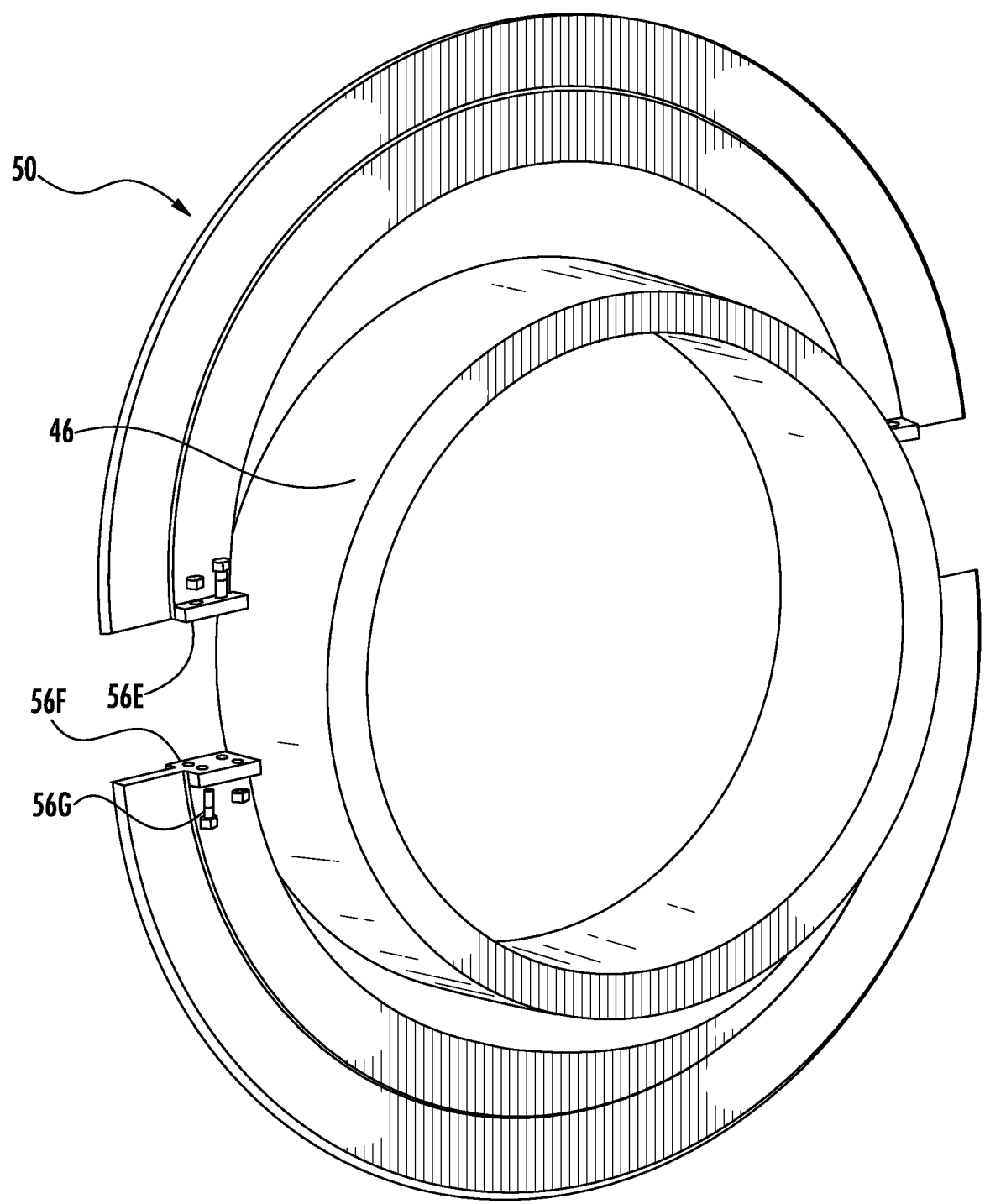

Turning to FIGS. 11A-11B, an alternative flanged disc segment 50 is illustrated. Each flanged disc segment 50 in this embodiment is a disc without a band 54. The resulting flanges 56 have radially outer and inner portions 56A, 56B. The outer portion 56A forms the braking rotor. The inner portion 56B is axially thicker than the outer portion 56A, providing structural stability. In addition, circumferentially opposing ends 56C, 56D of the flanges 56 include axially extending flange connectors 56E, with through holes 56F, for connecting with circumferentially adjacent flanges 56 via bolts 56G.

Turning to FIGS. 12A-12D, another embodiment is illustrated for connecting each flanged disc segment 50 to the drum 46. Each flanged disc segment 50 in this embodiment is a two piece structure, including a band 54 for connecting a flange 56 to a drum 46. The flange 56 forms the braking rotor. The flange 56 and band 54 are welded together prior to being installed against the drum 46.

Figure 12A:
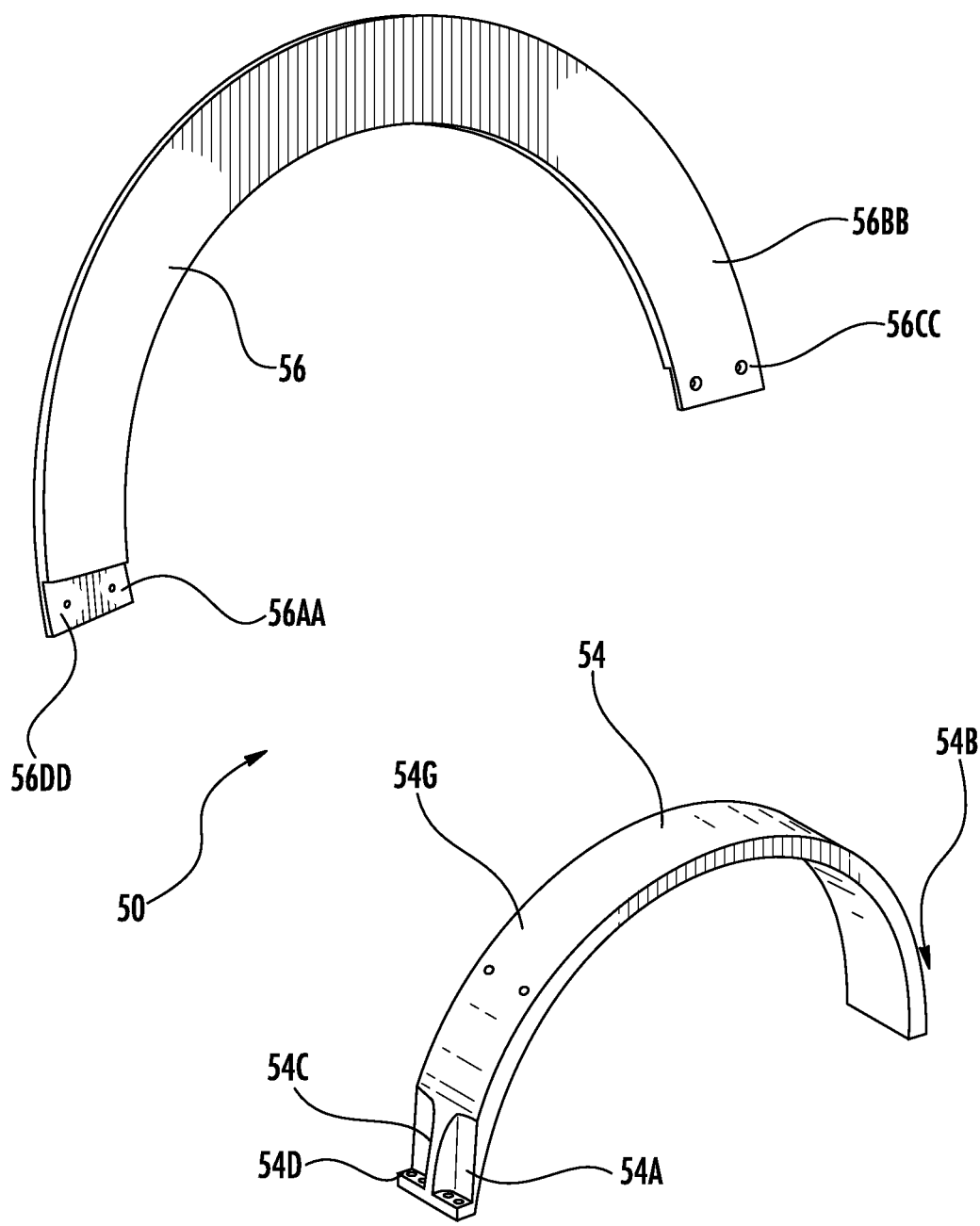
FIGS. 12A-12D illustrate another embodiment for attaching the disk to the drum of the elevator machine.
Figure 12B:
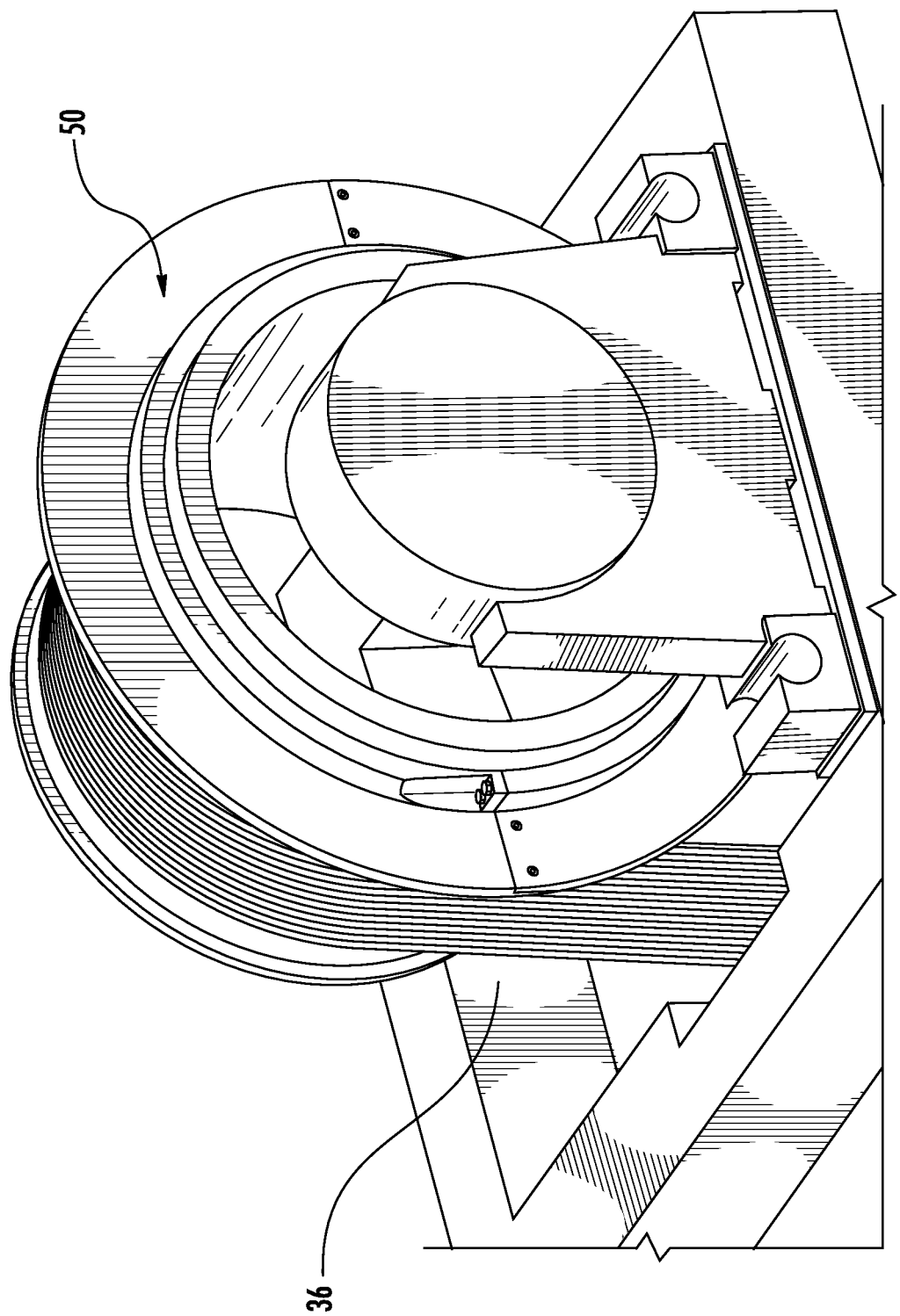
Figure 12C:
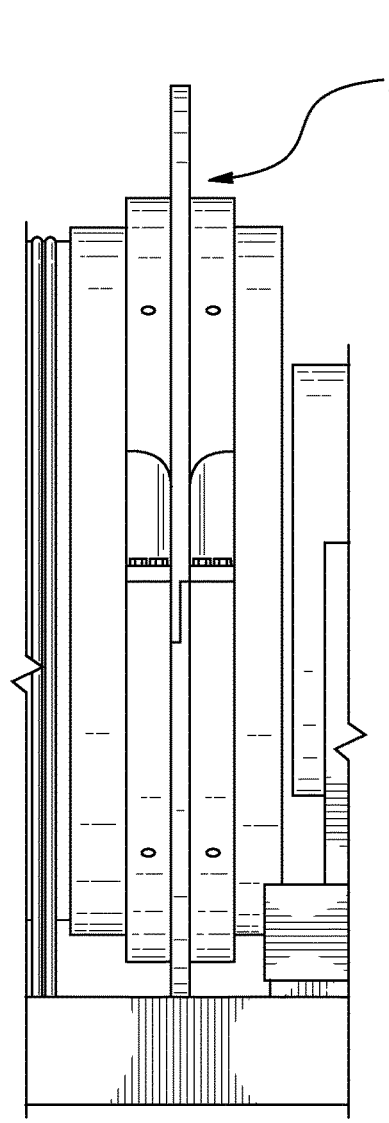
Figure 12D:
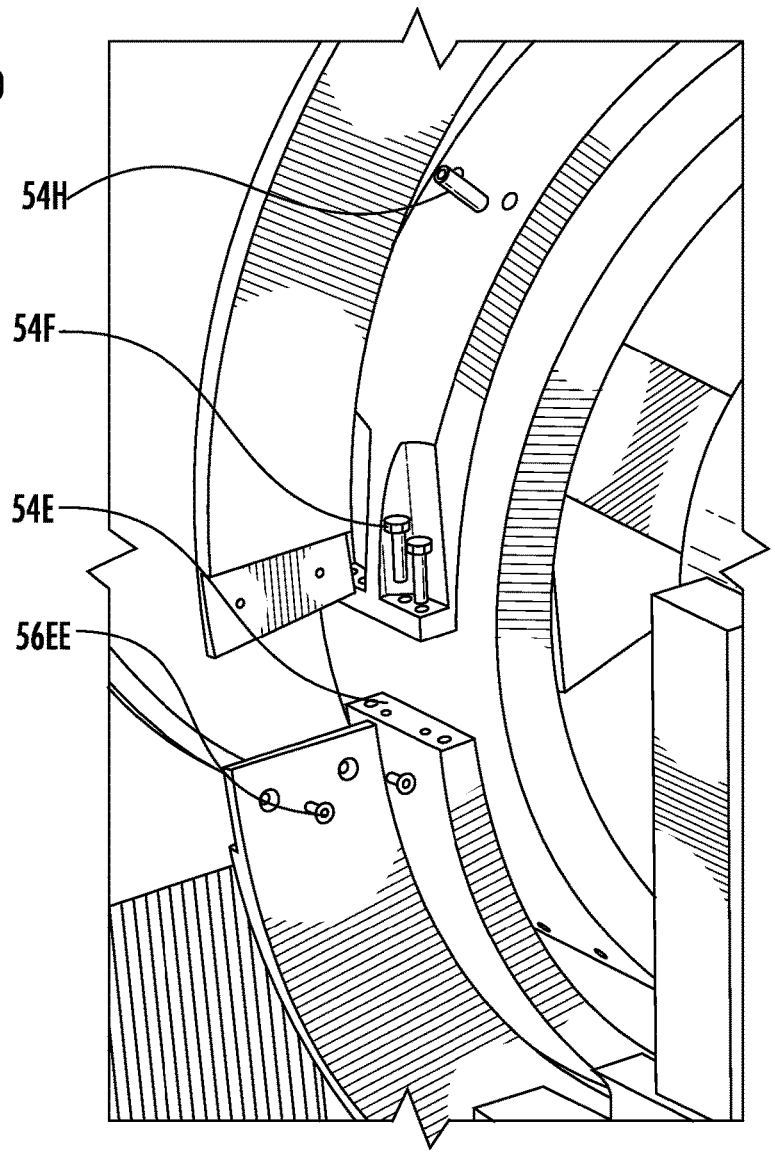
Figure 13A:
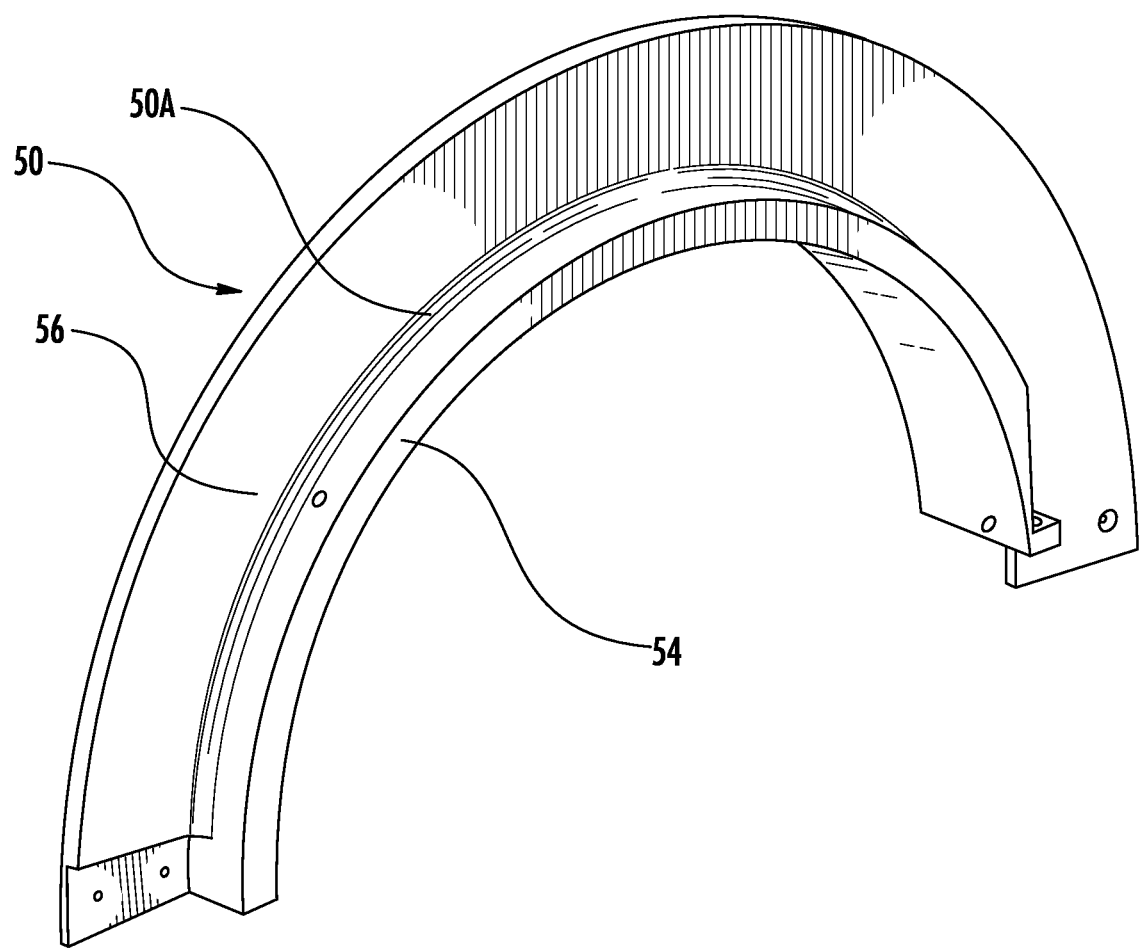
FIGS. 13A-13D illustrate another embodiment for attaching the disk to the drum of the elevator machine.
Figure 13B:
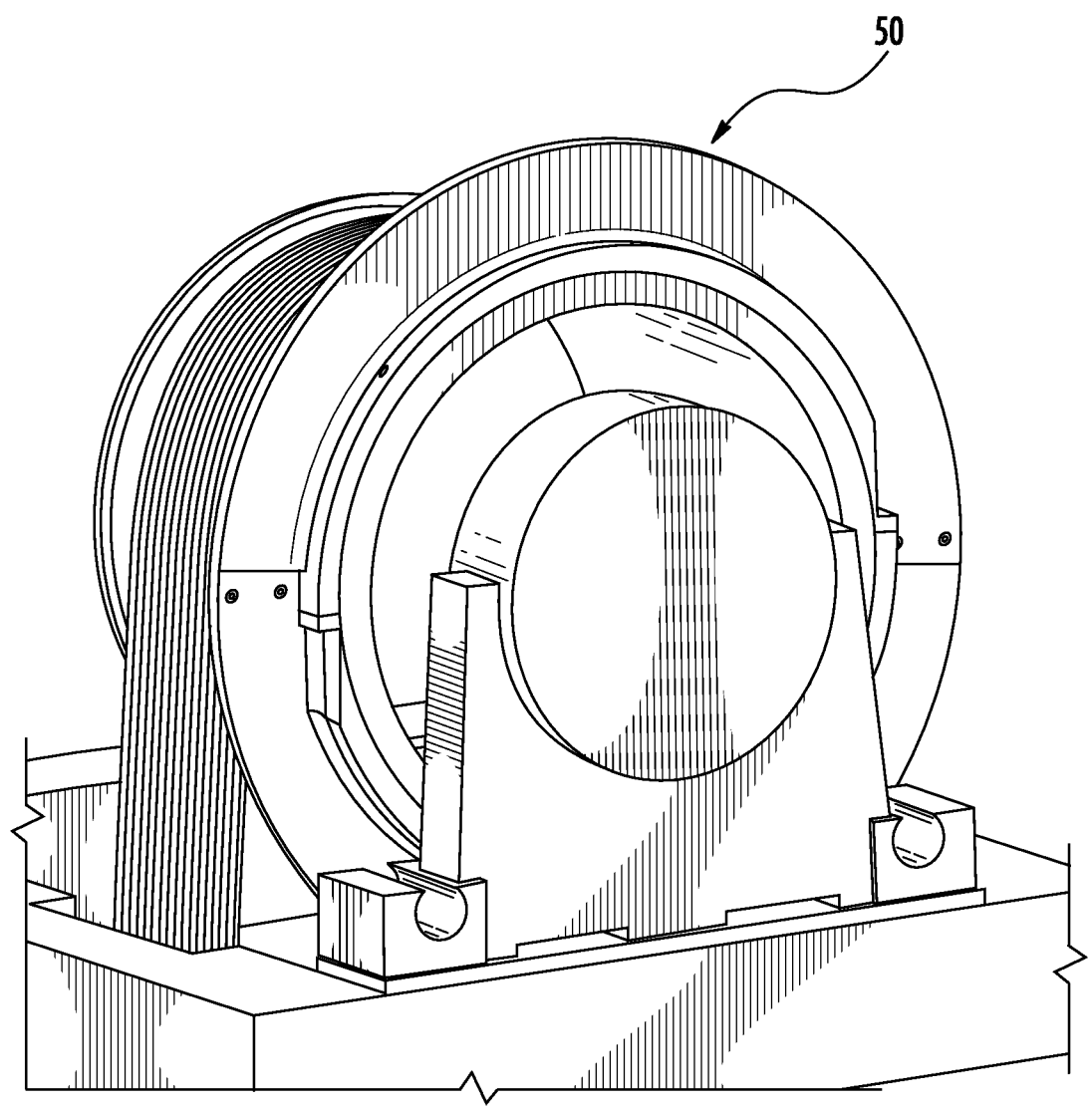
Figure 13D:
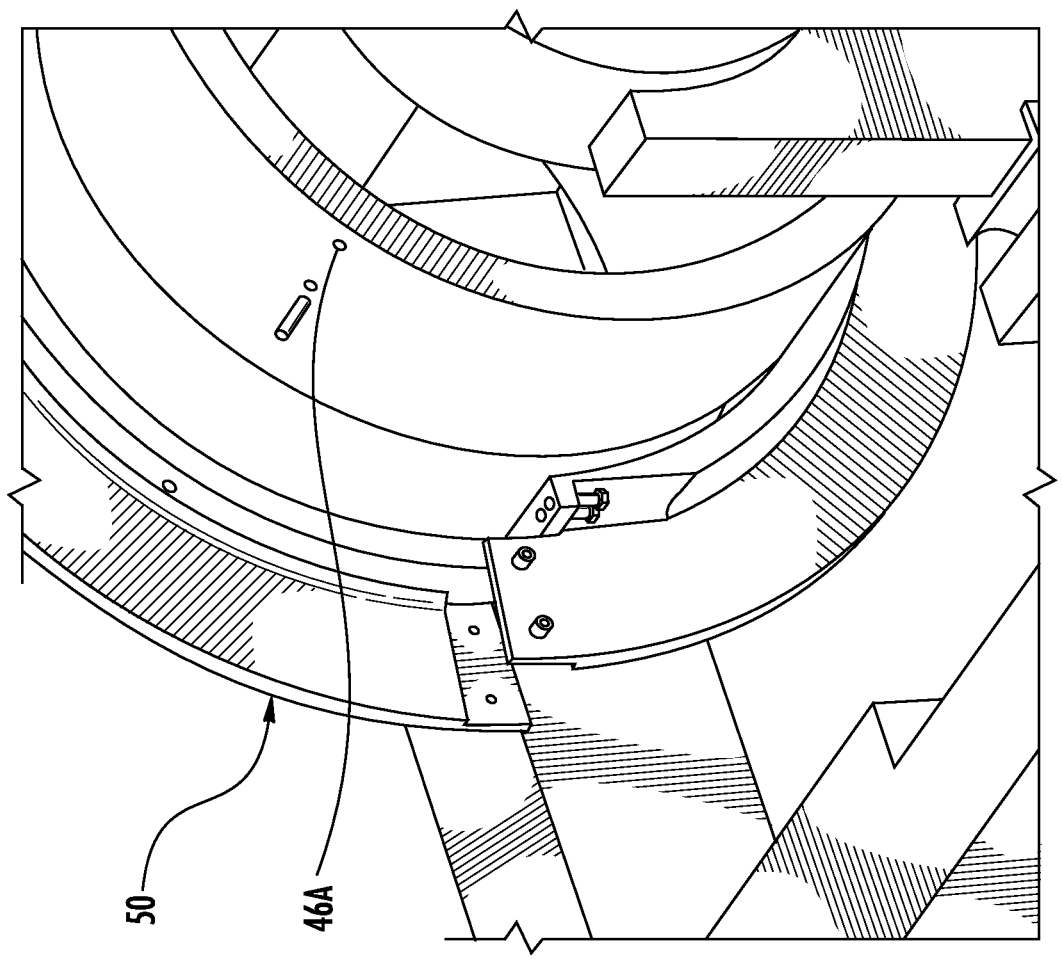
Figure 13C:
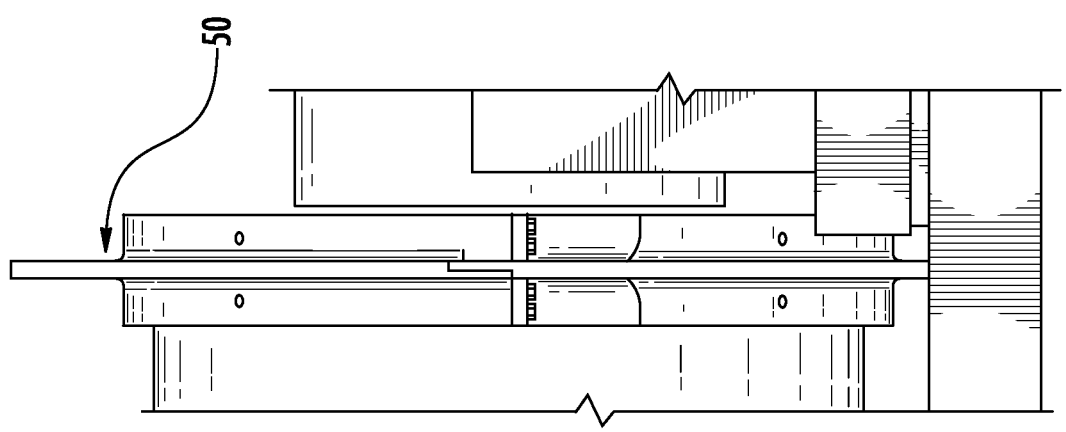

Circumferentially opposing ends 56AA, 56BB of the flange 56 are half-lapped in the circumferential direction, to connect with circumferentially adjacent flanges 56 as illustrated in FIGS. 12B-12D. One of the ends 56AA, 56BB is provided with a pair of tapered through holes 56CC, and the other of the ends includes threaded holes 56DD to flush mount a screw 56EE (FIG. 12D).

One of the circumferentially opposing ends 54A of the band 54 is provided with a pair of circumferentially extending countersunk impressions 54C and through-holes 54D (FIG. 12A). The other end 54B is provided with circumferentially extending threaded holes 54E (FIG. 12D). With this configuration, bolts 54F are used to connect circumferentially aligned flanged disc segments 50, as illustrated in FIGS. 12B-12D.

The band 54 is provided with four pairs of radially extending through-holes 54G (FIG. 12A). The drum 46 is machined to include matching holes 46A (FIG. 13D) and eight spring pins 54H (FIG. 12D) are applied to secure the band 54 to the drum 46.

Turning to FIGS. 13A-13D, another embodiment is illustrated for connecting flanged disc segments 50 to the drum 46. Each flanged disc segment 50 in this embodiment is a unitary structure, including a band 54 for connecting a flange 56 to a drum 46, the flange 56 forming the braking rotor. The flange 56 and band 54 are cast formed, with a radial corner joint 50A. Dimensionally, the embodiment 13A-13D is essentially the same as the structure illustrated in FIGS. 12A-12D, connecting to the drum 46 in similar fashion.

Those skilled in the art who have the benefit of this description will realize that a variety of brake configurations and a variety of machine configurations could be used that are different than the illustrated example. The techniques associated with the example retrofitting procedure may be used in a variety of elevator system configurations to retrofit a previously installed elevator machine with a supplementary brake.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of retrofitting an elevator machine with primary and secondary braking, the machine being disposed on a machine support frame in an elevator machine room, and engaging one or more ropes for providing selective movement of an elevator car disposed in an elevator shaft, the machine having a drive sheave including a cylindrical brake drum, and brake components including dual brake arms;
   the method comprising:
   removing the brake components;
   affixing flanged disc segments about the drum and interlocking the flanged disc segments to form a brake rotor; and
   mounting respective brake calipers to frame mounts for providing primary and secondary braking to the elevator machine,
   wherein each flanged disc segment includes a radially extending flange and an axially extending band, each band including disc guide holes, the drum includes matching drum guide holes formed on its outer diameter surface, and affixing the flanged disc segments to the drum includes positioning guide members therethrough, for orienting each flanged disc segment against the drum.

2. The method of claim 1, wherein each flanged disc segment is formed from a rolled angle.

3. The method of claim 1, wherein each flanged disc segment is formed by affixing together an annular band segment and an annular flange segment and providing therebetween a keyed connection.

4. The method of claim 3, wherein the annular band segments and annular flange segments are welded and/or bolted together.

5. The method of claim 1, wherein affixing each flanged disc segment to the drum includes connecting fastening members to circumferentially adjacent ends of each flange, and thereafter fastening together the fastening members.

6. The method of claim 5, wherein the fastening members are circumferentially adjacent tubes, secured together via a bolt, at least one washer and a nut.

7. The method of claim 1, wherein the guide members are bolts or dowels.

8. The method of claim 1, wherein:
mounting calipers includes mounting caliper mounting arms to the respective frame mounts, and mounting the calipers to the respective mounting arms, the mounting arms each include a same number of calipers, circumferentially spaced about each arm by a mutually constant angle; and
the machine includes a brake magnet housing with a spring guide rod, supported by a brake magnet mount, and mounting calipers includes mounting an end of the mounting arms to respective opposing ends of the brake magnet housing or spring guide rod.

9. The method of claim 1, wherein affixing each flanged disc to the drum includes wrapping a rod around an outer diameter of the drum, clamping together rod ends, and providing hoop compression with a parallel rod clamp.

10. The method of claim 9, wherein the rod ends are threaded and the clamp includes tubes and tightening nuts.

\* \* \* \* \*